US012794213B2

(12) United States Patent
Kodama et al.

(10) Patent No.: US 12,794,213 B2
(45) Date of Patent: Nov. 10, 2026

(54) CUTOFF DEVICE AND DRIVING DEVICE

(71) Applicant: Panasonic Intellectual Property Management Co., Ltd., Osaka (JP)

(72) Inventors: Kazuhiro Kodama, Hokkaido (JP); Shinya Kimoto, Osaka (JP); Hirokazu Fushiki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 224 days.

(21) Appl. No.: 18/685,886

(22) PCT Filed: Aug. 29, 2022

(86) PCT No.: PCT/JP2022/032415
§ 371 (c)(1),
(2) Date: Feb. 22, 2024

(87) PCT Pub. No.: WO2023/053814
PCT Pub. Date: Apr. 6, 2023

(65) Prior Publication Data

US 2024/0371588 A1 Nov. 7, 2024

(30) Foreign Application Priority Data

Sep. 30, 2021 (JP) ................................ 2021-161056

(51) Int. Cl.
*H02H 3/08* (2006.01)
*H01H 39/00* (2006.01)
(Continued)

(52) U.S. Cl.
CPC .............. *H02H 3/08* (2013.01); *H01H 39/00* (2013.01); *H01H 50/36* (2013.01); *H01H 89/00* (2013.01)

(58) Field of Classification Search
CPC ........ H01H 50/36; H01H 39/00; H01H 89/00; H01H 9/54; H01H 33/59; H02H 3/08
See application file for complete search history.

(56) References Cited

U.S. PATENT DOCUMENTS 5,886,860 A 3/1999 Chen et al.
6,411,190 B1 6/2002 Yamaguchi et al.
(Continued)

FOREIGN PATENT DOCUMENTS

CN 204011322 U * 12/2014
DE 19806345 A1 * 8/1999 ......... H01H 71/1081
(Continued)

OTHER PUBLICATIONS

The EPC Office Action dated Jan. 14, 2025 for the related European Patent Application No. 22875686.2.
(Continued)

*Primary Examiner* — Mohamad A Musleh
(74) *Attorney, Agent, or Firm* — Rimon P.C.

(57) ABSTRACT

This cutoff device includes: an electrical path; a first coil in which a first induced current corresponding to an electric current flowing through the electrical path is generated; a breaker that interrupts the electrical path; and wiring that electrically connects the first coil and the breaker. The breaker is driven with the first induced current generated in the first coil.

10 Claims, 18 Drawing Sheets

(51) Int. Cl.

| | |
|---|---|
| ***H01H 50/36*** | (2006.01) |
| ***H01H 89/00*** | (2006.01) |

(56) References Cited

U.S. PATENT DOCUMENTS

| | | | | |
|---|---|---|---|---|
| 2011/0261490 | A1* | 10/2011 | Weeks | H01H 83/04<br>361/63 |
| 2016/0204597 | A1 | 7/2016 | Hotta | |
| 2016/0276821 | A1* | 9/2016 | Politis | H02H 3/08 |
| 2019/0324075 | A1* | 10/2019 | Kinsella | G01R 15/183 |

FOREIGN PATENT DOCUMENTS

| | | | | | |
|---|---|---|---|---|---|
| EP | 3832684 | A1 | | 6/2021 | |
| JP | 2001-052584 | | | 2/2001 | |
| JP | 2015-073398 | | | 4/2015 | |
| JP | 2017527067 | A | * | 9/2017 | H01H 9/542 |
| JP | 2018-101549 | | | 6/2018 | |
| WO | 2018/116860 | A1 | | 6/2018 | |

OTHER PUBLICATIONS

International Search Report of PCT application No. PCT/JP2022/032415 dated Nov. 1, 2022.

The EPC Office Action dated May 9, 2025 for the related European Patent Application No. 22875686.2.

* cited by examiner

WHEN SHORT-CIRCUIT CURRENT = 1 kA

WHEN SHORT-CIRCUIT CURRENT = 2.5 kA

WHEN SHORT-CIRCUIT CURRENT = 3 kA

WHEN SHORT-CIRCUIT CURRENT = 3 kA,
Vr > THRESHOLD VALUE

CUTOFF DEVICE AND DRIVING DEVICE

TECHNICAL FIELD

The present disclosure relates to cutoff devices and driving devices.

BACKGROUND ART

Conventionally, research has been conducted on a cutoff device that when an overcurrent such as a short-circuit current flows to an electrical circuit installed in an automobile or the like, interrupts the electrical circuit to prevent significant damage (refer to Patent Literature (PTL) 1).

CITATION LIST

Patent Literature

PTL 1: Unexamined Japanese Patent Publication No. 2015-73398

SUMMARY OF INVENTION

However, with the technique disclosed in PTL 1, a structural element such as a battery or an electronic control unit (ECU) for supplying electric power for driving the cutoff device is required separately from a structural element for detecting an overcurrent, and if disconnection occurs due to an accident or the like, the cutoff device would fail to operate, which is problematic.

In view of this, the present disclosure provides a cutoff device and a driving device with simplified configurations.

A cutoff device according to one aspect of the present disclosure includes: an electrical path; a first coil in which a first induced current corresponding to an electric current flowing through the electrical path is generated; a breaker configured to interrupt the electrical path; and wiring configured to electrically connect the first coil and the breaker. The breaker is driven with the first induced current generated in the first coil.

A driving device according to one aspect of the present disclosure drives a device and includes: a coil in which an induced current corresponding to an electric current flowing through an electrical path is generated; and wiring configured to electrically connect the coil and the device. The device is driven with the induced current generated in the coil.

According to one aspect of the present disclosure, it is possible to provide a cutoff device, etc., with a simplified configuration.

DESCRIPTION OF EMBODIMENTS

Figure 1:
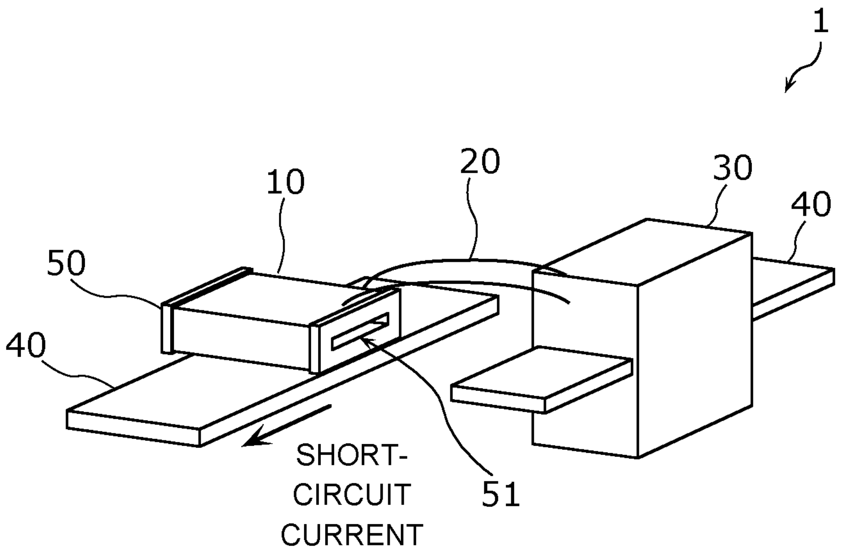
FIG. 1 is a diagram illustrating the configuration of a cutoff device according to Embodiment 1.

A cutoff device according to one aspect of the present disclosure includes: an electrical path; a first coil in which a first induced current corresponding to an electric current flowing through the electrical path is generated; a breaker configured to interrupt the electrical path; and wiring configured to electrically connect the first coil and the breaker. The breaker is driven with the first induced current generated in the first coil.

With this, the cutoff device can use, as electric power for driving the breaker, the first induced current generated in the first coil. This means that the cutoff device does not need to include a structural element such as a battery for supplying the electric power for driving the breaker. Thus, the cutoff device with a simplified configuration can be provided.

Furthermore, for example, the cutoff device may further include a switch connected between the first coil and the breaker and configured to electrically connect the first coil and the breaker when the first induced current exceeds a predetermined value.

With this, when the induced current based on an overcurrent exceeds the predetermined value, the cutoff device can operate the switch to drive the breaker with the induced current. This means that the cutoff device only needs to include a switch between the first coil and the breaker to enable detection of an overcurrent greater than or equal to a predetermined level. Therefore, with a simplified configuration, a cutoff device capable of detecting an overcurrent greater than or equal to a predetermined level can be provided.

Furthermore, for example, the switch may be a first semiconductor switch.

Furthermore, for example, the cutoff device may further include a switching circuit connected between the first coil and the first semiconductor switch and configured to switch connection between the first coil and the first semiconductor switch ON and OFF. The switching circuit may include: a switching unit configured to switch the connection between the first coil and the first semiconductor switch ON and OFF; a second coil in which a second induced current corresponding to the electric current is generated; an output unit configured to output a signal for turning the switching unit ON when the second induced current is supplied; and a second semiconductor switch connected between the second coil and the output unit and configured to turn ON when the second induced current exceeds a predetermined value.

With this, the induced current generated in the first coil can be used as a drive current for driving the breaker, and the induced current generated in the second coil can be used to detect an overcurrent greater than or equal to the predetermined level. In such a cutoff device, by adjusting the magnetic properties, etc., of the second coil, it is possible to arbitrarily adjust the current value of an overcurrent at the time of electrically connecting the switching unit. Thus, the cutoff device with improved versatility can be provided.

Furthermore, for example, the cutoff device may further include a switching circuit configured to switch the first semiconductor switch ON and OFF. The switching circuit may include: a first resistor and a second resistor connected to the first coil; and a switching unit connected in parallel with one of the first resistor and the second resistor and configured to turn OFF when the electric current flowing through the electrical path exceeds a predetermined value.

With this, using the Form B contact switching circuit, the cutoff device can drive the breaker when an overcurrent greater than or equal to the predetermined level flows to the electrical path.

Furthermore, for example, the switching circuit may include: a first fixed terminal and a second fixed terminal connected to both ends of one of the first resistor and the second resistor; a fixed yoke disposed near the electrical path; a movable yoke disposed at a distance from the fixed yoke and configured to form a magnetic circuit together with the fixed yoke, the movable yoke being movable toward the fixed yoke and included in the switching unit; and a conductive part configured to contact the first fixed terminal and the second fixed terminal and be fixed to the movable yoke in a state where the electric current flowing through the electrical path does not exceed the predetermined value.

With this, using a mechanical switch as the Form B contact switching circuit, the breaker can be driven when an overcurrent greater than or equal to the predetermined level flows to the electrical path. The mechanical switch is configured so as to operate according to magnetic flux generated by the overcurrent flowing to the electrical path, and therefore the configuration of the cutoff device can be simplified as compared to the case where a mechanical switch operates without using said overcurrent.

Furthermore, for example, the switching circuit includes: a second coil in which a second induced current corresponding to the electric current is generated; an output unit configured to output a signal for turning the switching unit OFF when the second induced current is supplied; and a second semiconductor switch connected between the second coil and the output unit and configured to turn ON when the second induced current exceeds a predetermined value.

With this, using a semiconductor switch as the Form B contact switching circuit, the breaker can be driven when an overcurrent greater than or equal to the predetermined level flows to the electrical path. The semiconductor switch is configured so as to operate according to magnetic flux generated by the overcurrent flowing to the electrical path, and therefore the configuration of the cutoff device can be simplified as compared to the case where a semiconductor switch operates without using said overcurrent.

Furthermore, for example, the cutoff device may further include a yoke inserted through a through-hole of the first coil.

With this, the magnetic flux can efficiently pass through the coil.

Furthermore, for example, the yoke may extend from the through-hole of the coil to face a side surface of the electrical path.

Thus, there are cases where the yoke can be easily attached to the electrical path.

Furthermore, for example, the yoke may be shaped to surround the electrical path.

With this, the magnetic flux can efficiently pass in the yoke.

Furthermore, for example, the magnetic circuit may include an open portion (a magnetic gap).

With this, the open portion (the magnetic gap) allows for a reduction in magnetic saturation of the yoke that is caused by the electric current flowing to the electrical path. Therefore, even when a large electric current flows to the electrical path, an induced current can be generated in the coil. By supplying such an induced current to the breaker, it is possible to effectively drive the breaker.

Furthermore, for example, a magnet may further be disposed in the open portion.

With this, the magnet disposed in the open portion allows for shifting of the electric current, that flows to the electrical path and causes magnetic saturation of the yoke. Therefore, an induced current can be generated in the coil when the electric current flowing to the electrical path is in a specific current range. By supplying such an induced current to the breaker, it is possible to effectively drive the breaker.

Furthermore, for example, a non-magnetic material may further be disposed in the open portion.

With this, the non-magnetic material allows for a reduction in magnetic saturation of the yoke; therefore, a larger induced current can be generated in the coil. By supplying such an induced current to the breaker, it is possible to effectively drive the breaker.

Furthermore, for example, the breaker may be a pyro-fuse, and an igniter for the pyro-fuse may be driven with the induced current.

Thus, the cutoff device does not need to include a structural element for driving the igniter for the pyro-fuse. Accordingly, the configuration of the cutoff device including the pyro-fuse can be simplified.

Furthermore, a driving device according to one aspect of the present disclosure drives a device and includes: a coil in which an induced current corresponding to an electric current flowing through an electrical path is generated; and wiring configured to electrically connect the coil and the device. The device is driven with the induced current generated in the coil.

With this, the driving device can use, as electric power for driving the device, the induced current generated in the coil. This means that the driving device does not need to include a structural element such as a battery for supplying the electric power for driving the device. Thus, the driving device with a simplified configuration can be provided.

Furthermore, for example, the cutoff device includes: a first switch connected between the first coil and the breaker; a second switch connected between the first switch and the breaker; and a capacitor including a first terminal connected between the first switch and the breaker. When a value of a voltage that is input to the first switch exceeds a first value, the first switch electrically connects the first coil and the capacitor. When a value of a voltage that is input to the second switch exceeds a second value, the second switch electrically connects the capacitor and the breaker. The first value is preferably greater than or equal to the second value.

With this, the induced power generated by the coil is stored in the capacitor and then supplied to the igniter. Therefore, even when the busbar temporarily generates a strong magnetic field with an electric current flowing to the busbar affected by noise or the like, the induced electromotive force generated by the coil is not likely to be supplied to the igniter. Thus, the cutoff device can prevent malfunction due to the effects of noise or the like and reduce degradation of a pyrotechnic composition for the breaker (igniter), for example.

Furthermore, for example, the semiconductor switch may be a first semiconductor switch including a SIDAC (registered trademark) or a thyristor.

Thus, it is possible to provide the cutoff device with a simplified configuration using a versatile semiconductor switch such as a SIDAC (registered trademark) or a thyristor.

Hereinafter, exemplary embodiments will be described in detail with reference to the drawings.

Note that each of the exemplary embodiments described below shows a general or specific example. The numerical values, shapes, materials, structural elements, the arrangement and connection of the structural elements, etc., shown in the following exemplary embodiments are mere examples, and are not intended to limit the present disclosure. Among the structural elements in the following exemplary embodiments, structural elements not recited in any one of the independent claims will be described as optional structural elements.

Note that the figures are schematic diagrams and are not necessarily precise illustrations. Therefore, for example, scale reduction, etc., in the figures are not necessarily the same. Furthermore, in the figures, substantially identical elements are assigned the same reference signs, and overlapping description will be omitted or simplified.

Furthermore, in the present specification, terms indicating the relationship between elements such as being orthogonal, parallel, and the same, terms indicating the shapes of elements such as a rectangle and a circle, numerical values, and numerical ranges are not expressions referring to only exact meanings, but are expressions referring to substantially equivalent ranges including, for example, approximately a few percent (for example, approximately 10%) differences.

Embodiment 1

Hereinafter, a cutoff device according to the present exemplary embodiment will be described with reference to FIG. 1 and FIG. 2.

1-1. Configuration of Cutoff Device

First, the configuration of the cutoff device according to the present exemplary embodiment will be described with reference to FIG. 1. FIG. 1 is a diagram illustrating the configuration of cutoff device 1 according to the present exemplary embodiment.

As illustrated in FIG. 1, cutoff device 1 includes coil 10, wiring 20, and breaker 30. Cutoff device 1 is characterized in that breaker 30 operates using the electromotive force of coil 10 excited by the magnetic field generated in busbar 40 when an overcurrent occurs.

Cutoff device 1 is, for example, an electrical circuit cutoff device that is installed in a vehicle such as an automobile or an electric appliance such as a home appliance and when an overcurrent occurs, interrupts an electrical circuit. Examples of the vehicle include a vehicle including a battery pack such as a battery electric vehicle (BEV) or a plug-in hybrid vehicle (PHEV). Note that cutoff device 1 may be installed in an object including an electrical circuit other than the vehicle or the electric appliance. The overcurrent is a large current that does not normally flow to busbar 40; for example, the overcurrent is an abnormal current that flows when an anomaly occurs in another device.

Coil 10, which is disposed near busbar 40, generates an induced current corresponding to an electric current flowing to busbar 40. Coil 10 is disposed so that magnetic flux generated according to a change in the electric current in busbar 40 passes through coil 10. Coil 10 is disposed so that the winding direction thereof intersects a direction in which the electric current flows in busbar 40 (for example, a direction in which busbar 40 extends). When the magnetic flux passes through coil 10, an induced current is generated in coil 10. Coil 10 is formed of a conducting wire wound on coil bobbin 50. Coil 10 is one example of the first coil.

Wiring 20 electrically connects coil 10 and breaker 30. In the present exemplary embodiment, wiring 20 directly connects coil 10 and breaker 30. In other words, coil 10 and breaker 30 are electrically connected without the use of a component other than wiring 20. Wiring 20 is configured to include a conducting wire.

Breaker 30 is a circuit breaker that interrupts busbar 40. Breaker 30 is driven with the induced current supplied from coil 10 through wiring 20. This means that breaker 30 is not driven with an electric current from other power supply sources such as a battery. In this manner, cutoff device 1 according to the present exemplary embodiment is characterized in that breaker 30 is driven with the induced current generated in coil 10.

Breaker 30 is embodied using a current breaker (pyro-fuse), for example. Breaker 30 includes a casing and houses, within the casing: igniter 31 (refer to FIG. 5) connected to coil 10; and a piston (not illustrated in the drawings) that cuts busbar 40. In the present exemplary embodiment, busbar 40 is provided extending through the casing. Igniter 31 is also referred to as a squib. In breaker 30, when an induced current greater than or equal to a predetermined level is generated in coil 10, a pyrotechnic composition included in igniter 31 is ignited with the induced current, a gas-generating agent or the like is ignited by way of the ignition of the pyrotechnic composition, thus a high-pressure gas is generated, the gas pressure of the generated gas causes a piston to penetrate busbar 40, thus busbar 40 is cut, and the overcurrent is interrupted.

Note that breaker 30 is not limited to a pyro-fuse and may be, for example, a relay. The relay includes: a fixed connector and a movable connector that are electrically conductive; a piston that moves the movable connector away from the fixed connector; and igniter 31 in which a pyrotechnic composition is ignited with the induced current generated in coil 10 in order for the piston to move the movable contactor.

Busbar 40 is an electrically conductive path in which an electric current flows; in the present exemplary embodiment, busbar 40 is embodied using a conductor plate. When cutoff device 1 is installed in a vehicle, busbar 40 is, for example, a connecting line that connects an inverter and a motor, a connecting line that connects a secondary battery and a device (for example, an inverter) that receives power supplied thereto; or a connecting line that connects the secondary battery and a charging port. Busbar 40 may be a cable or may be a winding. Busbar 40 is one example of the electrical path.

Note that busbar 40 on which coil 10 is installed and busbar 40 extending through breaker 30 are electrically connected, for example.

Coil bobbin 50 is a tuber on which an electric wire is wound; coil bobbin 50 is formed of an electrically insulating material (for example, resin such as a synthetic resin). Coil bobbin 50 has through-hole 51 passing through coil 10 in the winding direction thereof. Through-hole 51 extends through coil 10. Through-hole 51 has a rectangular shape, but may have a circular shape or the like. Note that coil bobbin 50 is not an essential element.

1-2. Operation of Cutoff Device

Next, the operation of cutoff device 1 configured as described above will be descried with reference to FIG. 2. FIG. 2 is a diagram of cutoff device 1 according to the present exemplary embodiment as viewed in the direction of the arrow indicated in FIG. 1.

Figure 2:
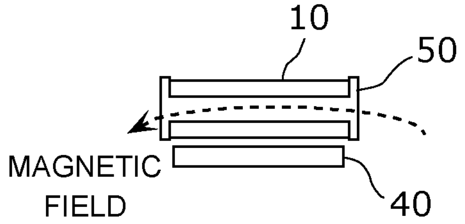
FIG. 2 is a diagram of a cutoff device according to Embodiment 1 as viewed in the direction of the arrow indicated in FIG. 1.

As illustrated in FIG. 2, when an overcurrent such as a short-circuit current flows to busbar 40, a magnetic field is generated. This causes a change in the magnetic flux passing through coil 10 (for example, inside through-hole 51), and thus an induced current is generated in coil 10 in a direction in which the change in the magnetic flux is offset. This induced current is supplied to breaker 30 via wiring 20, and igniter 31 of breaker 30 is ignited. In other words, the induced current generated in coil 10 is used as a drive current for driving breaker 30. Note that in the following description, there are cases where the operation, etc., of cutoff device 1 may be described using a short-circuit current which is one example of the overcurrent.

As just described, coil 10 according to the present exemplary embodiment includes a function of generating the drive current (the induced current) for driving breaker 30. Note that the induced current generated in coil 10 is not supplied to a central processing unit (CPU) that detects an overcurrent and provides an instruction to drive breaker 30.

In this manner, cutoff device 1 is capable of driving breaker 30 with the electric current (a change in the electric current) flowing to busbar 40 without obtaining information from other devices (for example, a sensor). Note that cutoff device 1 may further be configured to receive a signal from an electronic control unit or the like and drive breaker 30, for example.

Variation of Embodiment 1

Figure 3A:
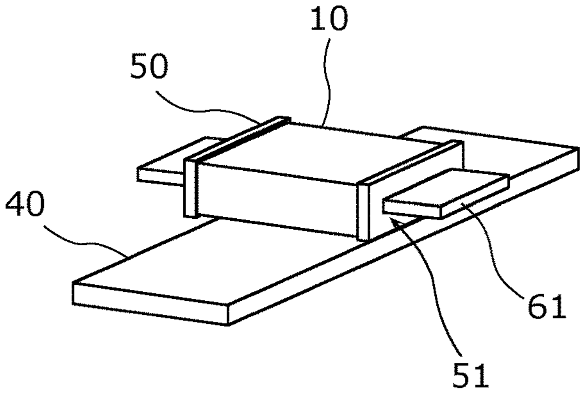
FIG. 3A is a diagram illustrating the first example of the configuration of a cutoff device according to a variation of Embodiment 1.

Other elements of cutoff device 1 described above will be described with reference to FIG. 3A to FIG. 3J. A cutoff device according to the present variation is different from cutoff device 1 according to Embodiment 1 mainly in that a yoke for reducing magnetic resistance is included. A reduction in the magnetic resistance leads to an increase in magnetic flux that passes through coil 10 when an overcurrent flows, allowing for an increase in the induced current. The shape, etc., of the yoke will be described below. FIG. 3A is a diagram illustrating the first example of the configuration of the cutoff device according to the present variation. Note that FIG. 3A to FIG. 3J illustrate only coil 10 and the yoke as the elements of the cutoff device. Note that the yoke in the present specification generally refers to an object having physical properties of passing magnetic flux.

Examples of the elements of the magnetic circuit including the yoke will be described below with reference to FIG. 3A to FIG. 3J.

As illustrated in FIG. 3A, the cutoff device may further include yoke 61 extending through coil 10. In the example illustrated in FIG. 3A, yoke 61 is disposed so as to extend through through-hole 51 of coil bobbin 50. The shape of yoke 61 is tabular, but this is not limiting. The longitudinal direction of yoke 61 intersects the direction in which busbar 40 extends; for example, the longitudinal direction of yoke 61 is orthogonal to the direction in which busbar 40 extends. Busbar 40 and yoke 61 are disposed in parallel, for example. Yoke 61 is formed of a magnetic material such as ferrite; it is sufficient that yoke 61 be formed of an object having low magnetic resistance. It is sufficient that yoke 61 be able to reduce magnetic resistance. For example, yoke 61 is formed of a metal material. Yoke 61 may have a stacked structure in which two or more metal plates are stacked. The metal plates stacked do not need to have the same thickness.

Figure 3B:
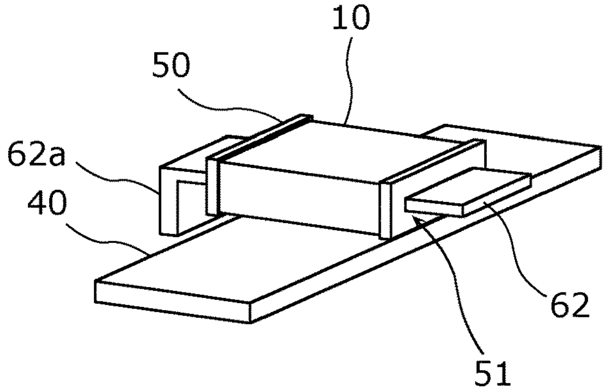
FIG. 3B is a diagram illustrating the second example of the configuration of a cutoff device according to a variation of Embodiment 1.

FIG. 3B is a diagram illustrating the second example of the configuration of the cutoff device according to the present variation.

As illustrated in FIG. 3B, yoke 62 may include protruding portion 62*a* that protrudes from coil 10 toward busbar 40. In the example illustrated in FIG. 3B, protruding portion 62*a* protrudes from one longitudinal end of yoke 62. Specifically, yoke 62 in the shape of the letter L rotated by 90 degrees. Protruding portion 62*a* is integrally formed with yoke 62. Note that more than one protruding portion 62*a* may be formed. For example, yoke 62 may further include a protruding portion that protrudes from the other longitudinal end of yoke 62 toward busbar 40.

Figure 3C:
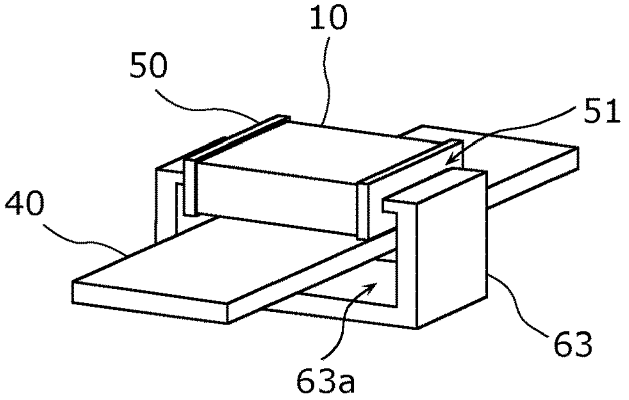
FIG. 3C is a diagram illustrating the third example of the configuration of a cutoff device according to a variation of Embodiment 1.

FIG. 3C is a diagram illustrating the third example of the configuration of the cutoff device according to the present variation.

As illustrated in FIG. 3C, yoke 63 may be in the shape of a loop surrounding busbar 40. For example, yoke 63 is formed into the shape of a rectangular ring. Yoke 63 is continuously formed without gaps. Through-hole 63*a* is formed in yoke 63, and busbar 40 is inserted through through-hole 63*a*.

Figure 3D:
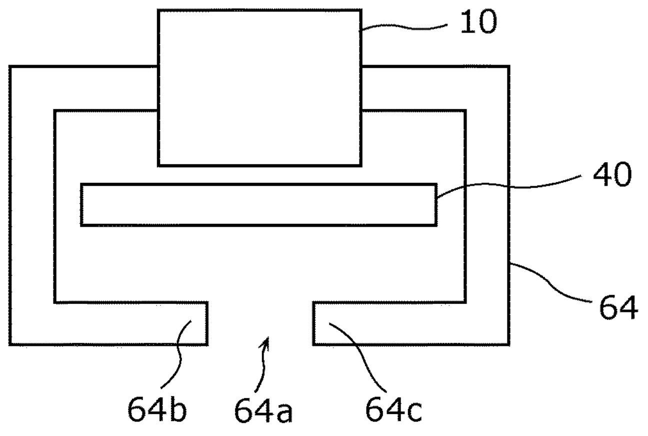
FIG. 3D is a diagram illustrating the fourth example of the configuration of a cutoff device according to a variation of Embodiment 1.

FIG. 3D is a diagram illustrating the fourth example of the configuration of the cutoff device according to the present variation. FIG. 3D is a diagram of the cutoff device according to the fourth example as viewed in the direction of the arrow indicated in FIG. 1.

As illustrated in FIG. 3D, looped yoke 64 may be formed by forming a slit having a predetermined width in a portion of a magnetic path. In other words, yoke 64 may be shaped so that a portion of a yoke in the shape of a closed loop is open as magnetic gap 64*a* (an open portion). Yoke 64 has the shape of a loop with one end 64*b* and other end 64*c* apart at a predetermined distance. Thus, yoke 64 may be what is called a gap core.

As just described, the loop-shaped magnetic circuit in the cutoff device according to the present variation may include magnetic gap 64*a*.

Note that the area (magnetic gap 64*a*) between end 64*b* and end 64*c* is space (for example, an air layer). The predetermined distance is a distance determined, as appropriate, on the basis of the value of an induced current that is desired to be generated in coil 10.

Figure 3E:
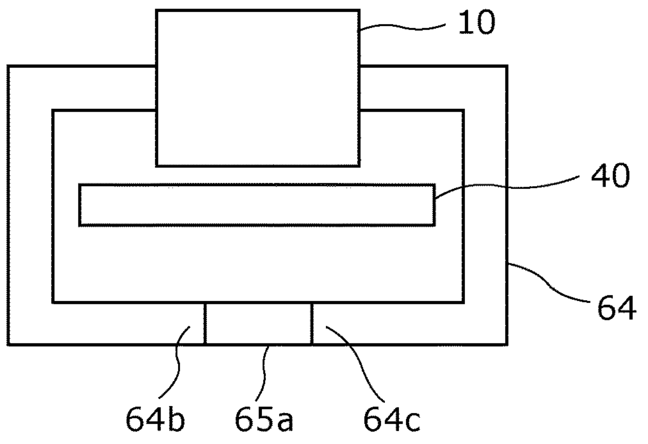
FIG. 3E is a diagram illustrating the fifth example of the configuration of a cutoff device according to a variation of Embodiment 1.

FIG. 3E is a diagram illustrating the fifth example of the configuration of the cutoff device according to the present variation.

As illustrated in FIG. 3E, the cutoff device according to the present variation includes yoke 64 and magnet 65*a*. Magnet 65*a* is disposed between end 64*b* and end 64*c*. In other words, magnet 65*a* is disposed so as to fill magnetic gap 64*a* (the open portion). Yoke 64 and magnet 65*a* form a closed magnetic circuit. The magnetic properties of magnet 65*a* are determined, as appropriate, on the basis of the value of an induced current that is desired to be generated in coil 10.

As just described, in the cutoff device according to the present variation, magnet 65*a* may be disposed in the magnetic circuit.

Figure 3F:
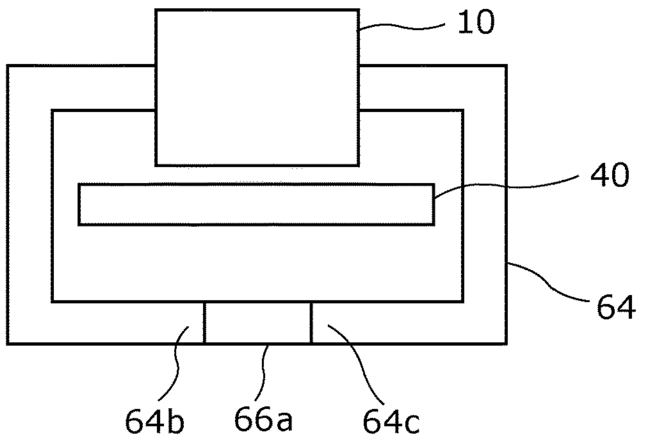
FIG. 3F is a diagram illustrating the sixth example of the configuration of a cutoff device according to a variation of Embodiment 1.

FIG. 3F is a diagram illustrating the sixth example of the configuration of the cutoff device according to the present variation.

As described in FIG. 3F, the cutoff device according to the present variation includes yoke 64 and resin member 66*a* (for example, a resin-formed component). Resin member 66*a* is disposed between end 64*b* and end 64*c*. For example, resin member 66*a* is disposed so as to fill magnetic gap 64*a* (the open portion). Yoke 64 and resin member 66*a* form a closed magnetic circuit. Resin member 66*a* is one example of the non-magnetic material. Note that the non-magnetic material is not limited to resin member 66*a*; it is sufficient that the non-magnetic material include a material that increases magnetic resistance as compared to the material of yoke 64.

As just described, in the cutoff device according to the present variation, resin member 66*a* may be disposed in the magnetic circuit.

Figure 3G:
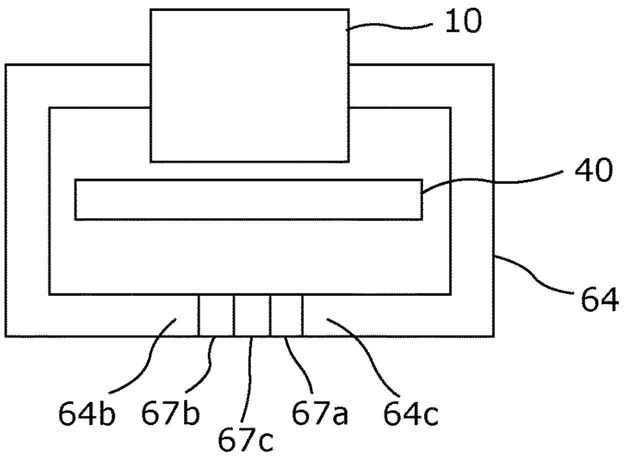
FIG. 3G is the first diagram illustrating the seventh example of the configuration of a cutoff device according to a variation of Embodiment 1.
Figure 3H:
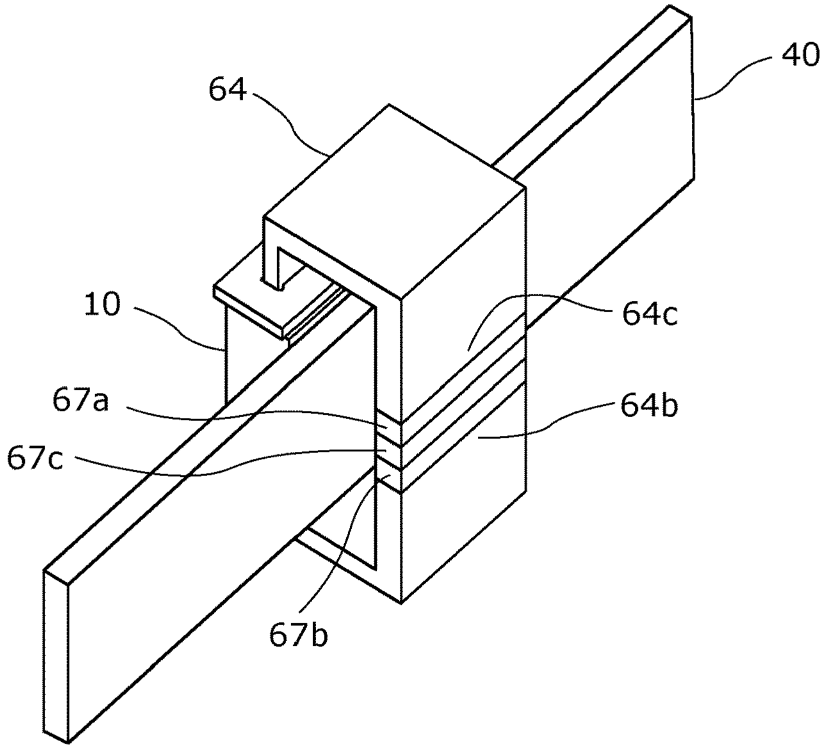
FIG. 3H is the second diagram illustrating the seventh example of the configuration of a cutoff device according to a variation of Embodiment 1.

FIG. 3G is the first diagram illustrating the seventh example of the configuration of the cutoff device according to the present variation. FIG. 3H is the second diagram illustrating the seventh example of the configuration of the cutoff device according to the present variation. FIG. 3H is a perspective view of the cutoff device illustrated in FIG. 3G, as viewed at an angle from below.

As illustrated in FIG. 3G and FIG. 3H, the cutoff device according to the present variation includes yoke 64, resin members 67*a*, 67*b*, and magnet 67*c*. Magnet 67*c* is disposed between resin member 67*a* and resin member 67*b*. Resin member 67*a*, magnet 67*c*, and resin member 67*b* are disposed in the stated order between end 64*b* and end 64*c*. For example, resin member 67*a*, magnet 67*c*, and resin member 67*b* are disposed so as to fill magnetic gap 64*a*. For example, resin member 67*a* is disposed so as to contact each of end 64*c* and magnet 67*c*, and resin member 67*b* is disposed so as to contact each of one end 64*b* and magnet 67*c*. Yoke 64, resin member 67*a*, magnet 67*c*, and resin member 67*b* form a closed magnetic circuit.

Resin member 67*a*, magnet 67*c*, and resin member 67*b* have elongated shapes, for example, but the shapes thereof are not limited to these examples.

As just described, in the cutoff device according to the present variation, magnet 67*c* and resin members 67*a*, 67*b* may be disposed in the magnetic circuit.

Note that the cutoff device does not need to have the configuration illustrated in FIG. 3G as long as a resin member and a magnet are disposed in magnetic gap 64*a*. The cutoff device may be configured such that a resin member is sandwiched between two magnets or may be configured to include one resin member and one magnet, for example.

Figure 3I:
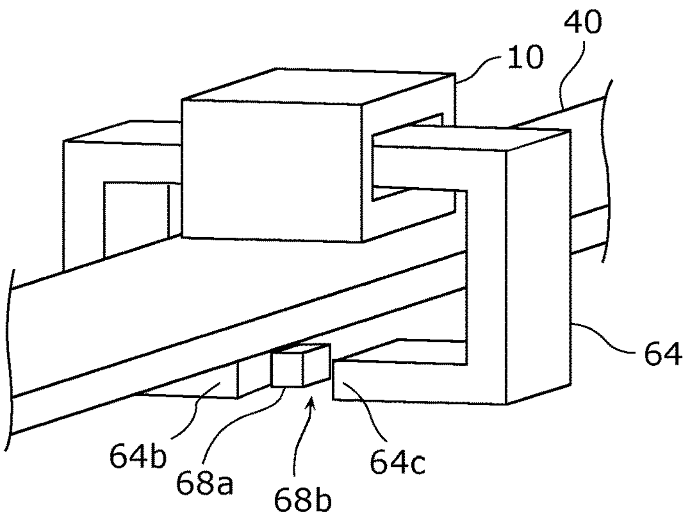
FIG. 3I is a diagram illustrating the eighth example of the configuration of a cutoff device according to a variation of Embodiment 1.

FIG. 3I is a diagram illustrating the eighth example of the configuration of the cutoff device according to the present variation.

As illustrated in FIG. 3I, the cutoff device according to the present variation includes yoke 64 and magnet 68*a*. Magnet 68*a* is disposed in a part of the area between end 64*b* and end 64*c*. In other words, space (magnetic gap 68*b*) is formed between end 64*b* and end 64*c*.

Figure 3J:
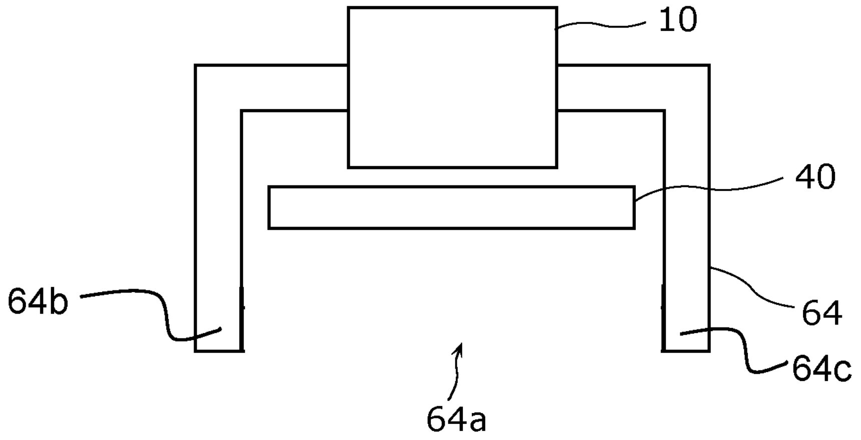
FIG. 3J is a diagram illustrating the ninth example of the configuration of a cutoff device according to a variation of Embodiment 1.

FIG. 3J is a diagram illustrating the ninth example of the configuration of the cutoff device according to the present variation. As illustrated in FIG. 3J, the distance between one end 64*b* and other end 64*c* may be greater than that in the configuration illustrated in FIG. 3D. In other words, yoke 64 may surround busbar 40 from three sides, as illustrated in FIG. 3J. Note that in FIG. 3J, elements that are substantially the same as those in FIG. 3D are assigned the same reference signs and detailed description thereof is omitted.

Embodiment 2

Hereinafter, a cutoff device according to the present exemplary embodiment will be described with reference to FIG. 4 to FIG. 7. Note that the following description will focus on the differences from Embodiment 1 while omitting or simplifying description of details that are the same as or similar to those described in Embodiment 1.

2-1. Configuration of Cutoff Device

Figure 4:
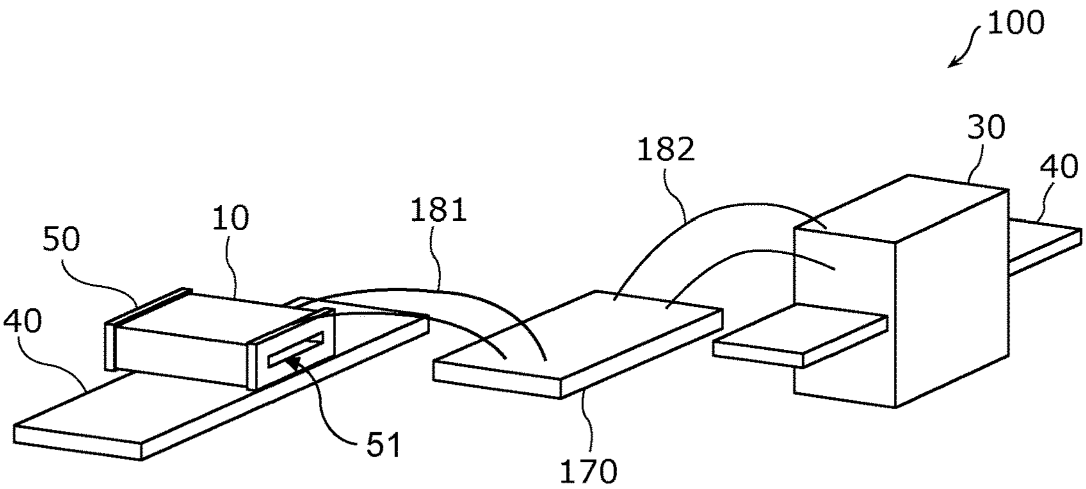
FIG. 4 is a diagram illustrating the configuration of a cutoff device according to Embodiment 2.
Figure 5:
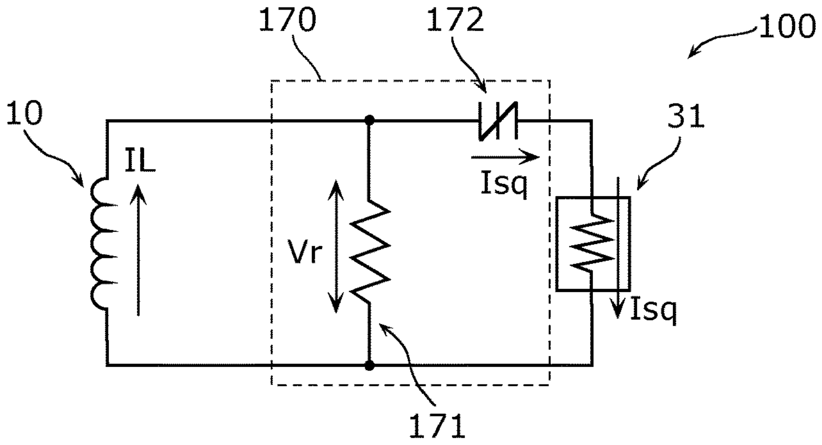
FIG. 5 is a diagram illustrating one example of the circuit configuration of a cutoff device according to Embodiment 2.

First, the configuration of the cutoff device according to the present exemplary embodiment will be described with reference to FIG. 4 to FIG. 6. FIG. 4 is a diagram illustrating the configuration of cutoff device 100 according to the present exemplary embodiment. FIG. 5 is a diagram illustrating one example of the circuit configuration of cutoff device 100 according to the present exemplary embodiment. Cutoff device 100 according to the present exemplary embodiment is different from cutoff device 1 according to Embodiment 1 mainly in that coil 10 and breaker 30 (igniter 31) are connected via substrate 170.

As illustrated in FIG. 4, cutoff device 100 includes coil 10, breaker 30, substrate 170, first wiring 181, and second wiring 182. First wiring 181 and second wiring 182 are one example of the wiring.

Substrate 170, which is connected to coil 10 via first wiring 181 and is connected to breaker 30 via second wiring 182, is provided in order to switch between ON (conduction) and OFF (non-conduction) of the electrical connection between coil 10 and breaker 30. On substrate 170, mounted is an electronic component (for example, resistor 171 and semiconductor switch 172 to be described later) for electrically connecting coil 10 and breaker 30 when the value of the induced current supplied from coil 10 exceeds a predetermined current value. The induced current generated in coil 10 is supplied to substrate 170 via first wiring 181, and when the value of the induced current supplied exceeds the predetermined current value, the induced current supplied from coil 10 is supplied to breaker 30.

As illustrated in FIG. 5, the circuit configuration of cutoff device 100 includes coil 10, resistor 171, semiconductor switch 172, and igniter 31. Resistor 171 and semiconductor switch 172 are mounted on substrate 170.

Resistor 171, which is connected in parallel with semiconductor switch 172, is provided in order to turn ON semiconductor switch 172 when a predetermined overcurrent flows to busbar 40. Both ends of resistor 171 are connected to both ends of coil 10. The resistance value of resistor 171 is set to a resistance value at which when induced current IL corresponding to the predetermined overcurrent is generated in coil 10, semiconductor switch 172 can turn ON.

Semiconductor switch 172 is a switch that is connected in series between coil 10 and igniter 31 and switches between supplying and not supplying the induced current generated in coil 10 to igniter 31. In the present exemplary embodiment, semiconductor switch 172 is a Form A contact switch which is OFF during normal operation and turns ON when an overcurrent occurs. When the value of the induced voltage (or the induced current) generated in coil 10 exceeds a predetermined value, semiconductor switch 172 electrically connects coil 10 and igniter 31.

In the present exemplary embodiment, semiconductor switch 172 includes the SIDAC (registered trademark). The SIDAC (registered trademark) is a semiconductor element that is energized by applying a predetermined voltage thereto. Note that the normal operation refers to the state where no overcurrent is flowing to busbar 40. Semiconductor switch 172 is one example of the switch and the first semiconductor switch.

Resistor 171, semiconductor switch 172, and igniter 31 are connected in parallel.

Thus, in cutoff device 100, the induced current generated in coil 10 is used as a drive current for driving igniter 31 and is also used as a detection (threshold value determination) current for detecting that an overcurrent greater than or equal to a predetermined level is flowing.

Note that it is sufficient that semiconductor switch 172 be a switch that transitions from OFF to ON when voltage Vr generated at resistor 171 exceeds a predetermined voltage; semiconductor switch 172 is not limited to the SIDAC (registered trademark). Another example of semiconductor switch 172 will be described with reference to FIG. 6. FIG. 6 is a diagram illustrating another example of the circuit configuration of cutoff device 100 according to the present exemplary embodiment.

Figure 6:
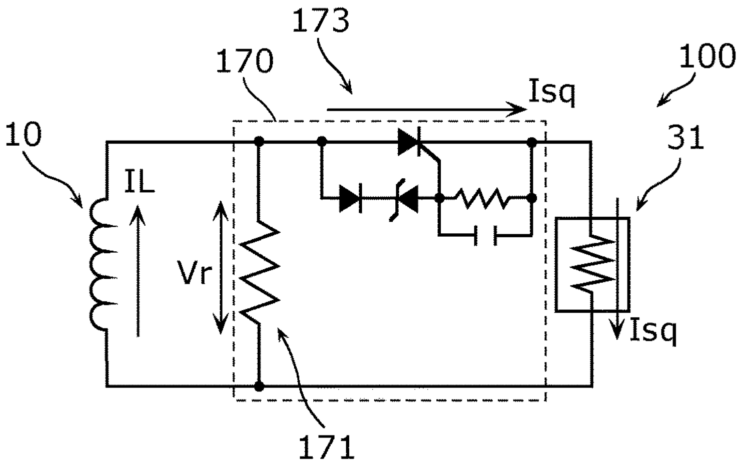
FIG. 6 is a diagram illustrating another example of the circuit configuration of a cutoff device according to Embodiment 2.

As illustrated in FIG. 6, cutoff device 100 may include semiconductor switch 173 instead of semiconductor switch 172 illustrated in FIG. 5. Semiconductor switch 173 may be composed of a switch including a thyristor. Specifically, semiconductor switch 173 may include a thyristor, a diode, a Zener diode, a resistor, and a capacitor. Semiconductor switch 173 is one example of the first semiconductor switch.

Cutoff device 100 may include, instead of semiconductor switch 172, a mechanical switch (for example, an electromagnetic relay) that turns ON and OFF according to magnetic flux based on an overcurrent in busbar 40.

Thus, coil 10 according to the present exemplary embodiment includes the function of detecting an overcurrent and the function of generating the drive current (the induced current) for driving breaker 30.

2-2. Operation of Cutoff Device

Figure 7:
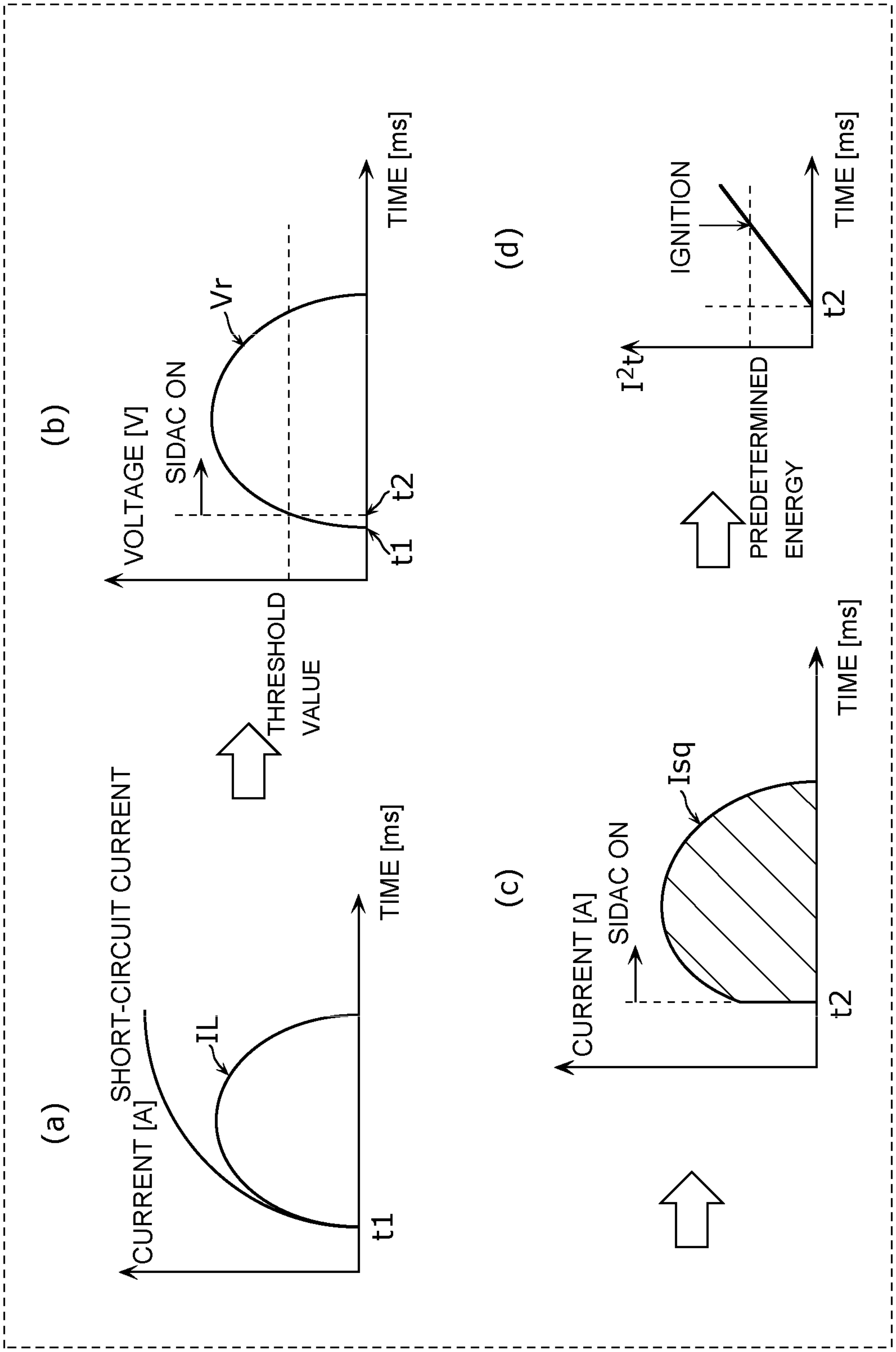
FIG. 7 is a diagram illustrating the operation of a cutoff device according to Embodiment 2.

Next, the operation of cutoff device 100 configured as described above will be descried with reference to FIG. 4 to FIG. 7. FIG. 7 is a diagram illustrating the operation of cutoff device 100 according to the present exemplary embodiment. FIG. 7 illustrates, in (a), the relationship between the short-circuit current and induced current IL generated in coil 10, with the horizontal axis representing time and the vertical axis representing an electric current (a current value). FIG. 7 illustrates, in (b), the relationship between the operation of the SIDAC (registered trademark) and voltage Vr generated when the induced current flows to resistor 171, with the horizontal axis representing time and the vertical axis representing a voltage. FIG. 7 illustrates, in (c), the relationship between the operation of semiconductor switch 172 and current Isq passing through semiconductor switch 172 and flowing to igniter 31, with the horizontal axis representing time and the vertical axis representing an electric current. FIG. 7 illustrates, in (d), the relationship between ignition and energy supplied to igniter 31, with the horizontal axis representing time and the vertical axis representing an energy ($I^2t$) current. Here, I denotes an electric current supplied to igniter 31, and t denotes time during which said electric current is supplied.

The following description will be given with reference to FIG. 4 and FIG. 7. As illustrated in (a) in FIG. 7, when an overcurrent such as a short-circuit current flows to busbar 40 at time t1, a magnetic field is generated (changed) around busbar 40, and the magnetic flux passing through coil 10 (for example, inside through-hole 51) changes, and thus induced current IL is generated in coil 10 in a direction in which this change in the magnetic flux is offset. Induced current IL is supplied to substrate 170 via first wiring 181.

Next, a description will be given with reference to FIG. 5 to FIG. 7. As illustrated in (b) in FIG. 7, induced current IL flows to resistor 171 mounted on substrate 170, and voltage Vr is generated at both ends of resistor 171; thus, when said voltage Vr reaches a threshold value (a threshold voltage) at which semiconductor switch 172 turns ON, semiconductor switch 172 turns ON (ON). FIG. 7 illustrates, in (b), an example in which semiconductor switch 172 turns ON at time t2 following time t1. Thus, current Isq, which is a portion of induced current IL generated in coil 10, is supplied to igniter 31 through semiconductor switch 172 on or after time t2. Note that at this time, a portion of induced current IL generated in coil 10 also flows to resistor 171.

Next, a description will be given with reference to FIG. 5 to FIG. 7. As illustrated in in (c) in FIG. 7, current Isq is supplied to igniter 31 on or after time t2. Current Isq has a value corresponding to the value of induced current IL.

Next, a description will be given with reference to FIG. 5 or FIG. 6. As illustrated in (d) in FIG. 7, when energy greater than or equal to predetermined energy is supplied to igniter 31, the pyrotechnic composition included in igniter 31 is ignited. The energy that is supplied to igniter 31 corresponds to the area enclosed by the horizontal axis and current Isq indicated in (c) in FIG. 7 (the area of the hatched region illustrated in (c) in FIG. 7).

Thus, when an overcurrent greater than or equal to a certain level flows, cutoff device 100 can interrupt the overcurrent by causing the piston to penetrate busbar 40 and thus cut busbar 40.

Furthermore, using coil 10, cutoff device 100 can detect in the transformer mode that an overcurrent is flowing to busbar 40. Cutoff device 100 can detect by itself that the overcurrent flowing to busbar 40 has reached a predetermined level or more.

Embodiment 3

Hereinafter, a cutoff device according to the present exemplary embodiment will be described with reference to FIG. 8 to FIG. 11C. Note that the following description will focus on the differences from Embodiment 2 while omitting or simplifying description of details that are the same as or similar to those described in Embodiment 2.

3-1. Configuration of Cutoff Device

Figure 8:
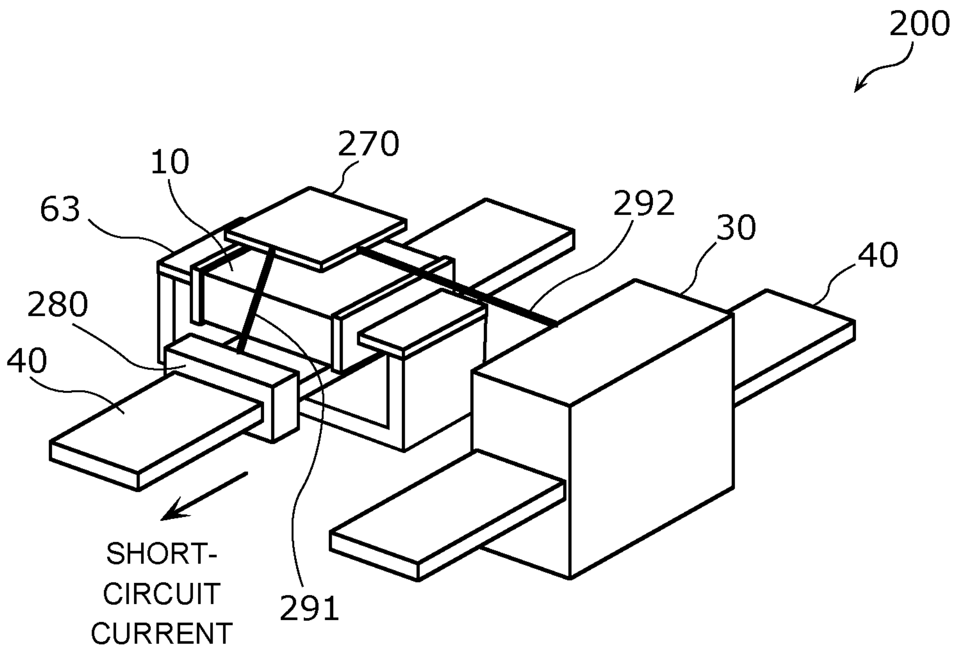
FIG. 8 is a diagram illustrating the configuration of a cutoff device according to Embodiment 3.
Figure 9A:
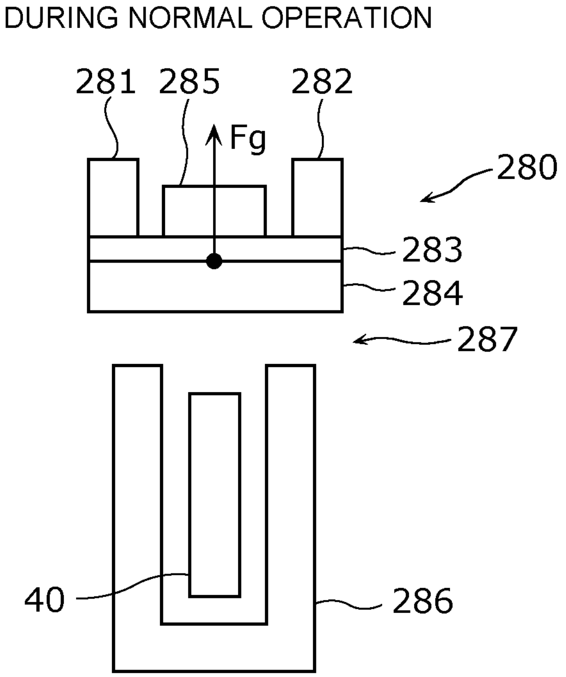
FIG. 9A is a diagram illustrating a relay included in a cutoff device according to Embodiment 3 that is seen during normal operation.
Figure 9B:
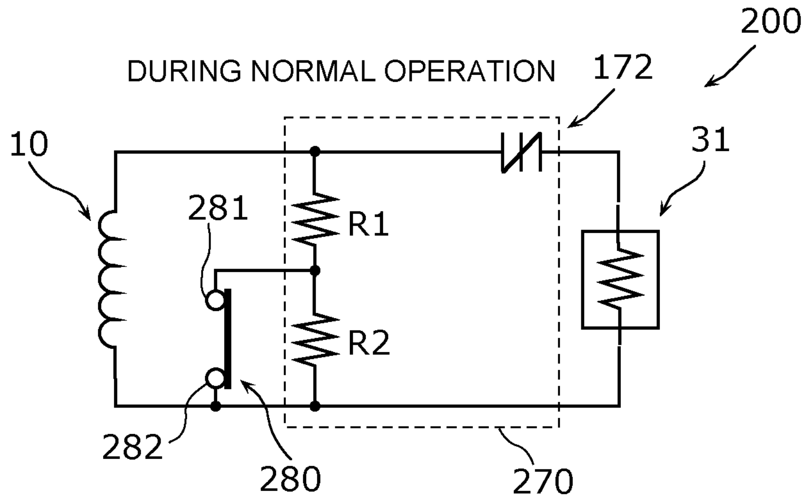
FIG. 9B is a diagram illustrating one example of the circuit configuration of a cutoff device according to Embodiment 3.

First, the configuration of the cutoff device according to the present exemplary embodiment will be described with reference to FIG. 8 to FIG. 9B. FIG. 8 is a diagram illustrating the configuration of cutoff device 200 according to the present exemplary embodiment. FIG. 9A is a diagram illustrating a relay included in cutoff device 200 according to the present exemplary embodiment that is seen during normal operation. FIG. 9B is a diagram illustrating one example of the circuit configuration of cutoff device 200 according to the present exemplary embodiment. Cutoff device 200 according to the present exemplary embodiment is different from cutoff device 100 according to Embodiment 2 mainly in that Form B contact relay switch 280 is included. Note that FIG. 9A and FIG. 9B illustrate a state seen during normal operation.

As illustrated in FIG. 8 to FIG. 9B, cutoff device 200 includes coil 10, breaker 30, substrate 270, relay switch 280, and cables 291, 292. Note that in FIG. 8, illustration of wiring (for example, a cable) that connects coil 10 and substrate 270 is omitted, but coil 10 and substrate 270 are electrically connected. Cables 291, 292 are one example of the wiring.

Substrate 270 is connected to coil 10 and is connected to relay switch 280 via cable 291. Substrate 270, which is connected to breaker 30 via cable 292, is provided in order to switch the electrical connection between coil 10 and breaker 30 ON and OFF together with relay switch 280. On substrate 270, mounted is an electronic component (for example, resistors R1, R2 and semiconductor switch 172 to be described later) for electrically connecting coil 10 and breaker 30 when the value of the induced current supplied from coil 10 exceeds a predetermined current value. The induced current generated in coil 10 is supplied to substrate 270, and when the value of the induced current supplied exceeds the predetermined current value, relay switch 280 and the electronic component allow the induced current supplied from coil 10 to be supplied to breaker 30.

As illustrated in FIG. 9B, the circuit configuration of cutoff device 200 includes coil 10, resistors R1, R2, semiconductor switch 172, relay switch 280, and igniter 31. Resistors R1, R2 and semiconductor switch 172 are mounted on substrate 270.

Registers R1, R2 are connected in series, and one end of resistor R1 and the other end of resistor R2 are connected to both ends of coil 10. The resistance values of resistors R1, R2 are set, as appropriate, according to the predetermined current value. The resistance values of resistors R1, R2 are set, for example, so that voltage Vr (refer to FIG. 10B) generated at resistors R1, R2 when the induced current generated in coil 10 flows through resistors R1, R2 exceeds the threshold value (the threshold voltage) of semiconductor switch 172. Resistors R1, R2, semiconductor switch 172, and igniter 31 are connected in parallel. Resistor R1 is one example of the first resistor, and resistor R2 is one example of the second resistor.

Relay switch 280 is connected to the other end of resistor R1, one end of resistor R2 (the end thereof on the resistor R1 side), and the other end of resistor R2. In other words, in the present exemplary embodiment, relay switch 280 is connected in parallel with resistor R2. Relay switch 280 is a switch that turns ON and OFF according to the magnetic flux generated around busbar 40 when an overcurrent flows to busbar 40. Note that it is sufficient that relay switch 280 be connected in parallel with one of resistor R1 and resistor R2.

As illustrated in FIG. 9A, relay switch 280 includes fixed terminals 281, 282, copper plate 283, movable yoke 284, magnet 285, and fixed yoke 286. During normal operation, gap 287 is formed between movable yoke 284 and fixed yoke 286. In other words, movable yoke 284 and fixed yoke 286 are located at a distance from each other during normal operation. Relay switch 280 is one example of the electromagnetic relay.

Fixed terminals 281, 282 are disposed at a distance from each other and during normal operation, are electrically connected to each other via copper plate 283. Fixed terminals 281, 282 are connected to both ends of resistor R2. In the present exemplary embodiment, fixed terminal 281 is connected to one terminal of resistor R2, and fixed terminal 282 is connected to the other end of resistor R2. Fixed terminals 281, 282 are formed of an electrically conductive material (for example, a metal). Fixed terminals 281, 282 are connected to cable 291 (refer to FIG. 8), and the induced current generated in coil 10 flows to fixed terminals 281, 282 via copper plate 283.

Copper plate 283 is an electrically conductive member for switching between conduction and non-conduction between fixed terminals 281, 282. Copper plate 283 is disposed so as to contact fixed terminals 281, 282 during normal operation. This means that there is conduction between fixed terminals 281, 282 during normal operation. Copper plate 283 is fixed to movable yoke 284 and moves along with movable yoke 284. Copper plate 283 may be formed of a metal other than copper as long as said metal is electrically conductive. Copper plate 283 is one example of the conductive part.

Movable yoke 284 is a yoke that is located at a distance from fixed yoke 286 during normal operation and when an overcurrent occurs, forms a magnetic circuit together with fixed yoke 286 and can move toward fixed yoke 286. Magnetic force of attraction Fg acts between movable yoke 284 and magnet 285. This means that movable yoke 284 is held at a position such that fixed terminals 281, 282 and copper plate 283 contact each other with force of attraction Fg.

Magnet 285, which is disposed on the opposite side of movable yoke 284 from fixed yoke 286, attracts movable yoke 284 to cause fixed terminals 281, 282 to conduct electricity through copper plate 283.

Fixed yoke 286 is fixed in place around busbar 40. In the present exemplary embodiment, fixed yoke 286 is disposed so as to surround busbar 40 along the direction of magnetic field that is generated when an overcurrent occurs in busbar 40. Fixed yoke 286 is in a U shape (for example, in the shape of a square bracket) open on the movable yoke 284 side. Thus, when an overcurrent occurs, a magnetic circuit is formed between fixed yoke 286 and movable yoke 284.

3-2. Operation of Cutoff Device

Figure 10A:
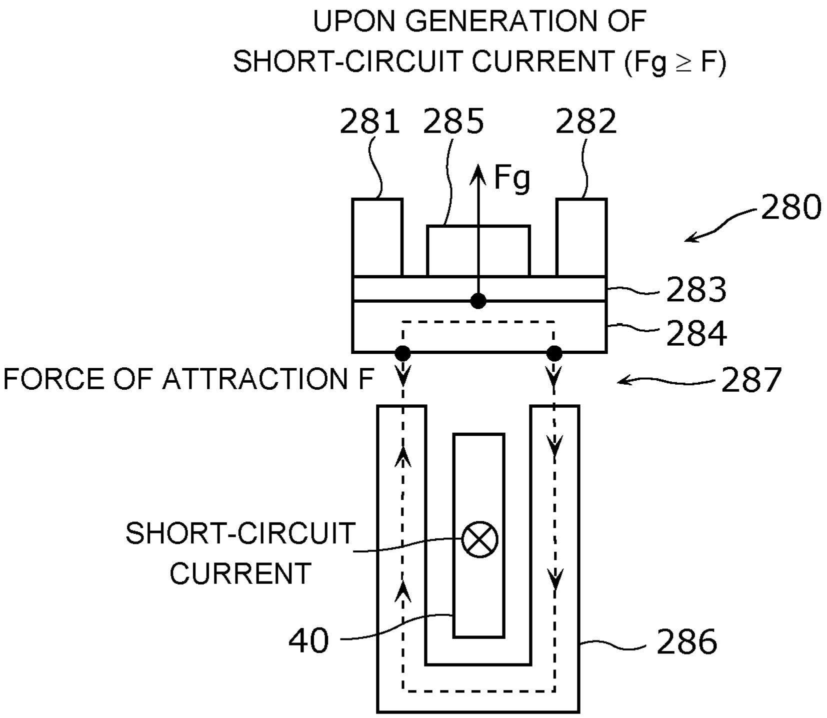
FIG. 10A is a diagram illustrating a relay included in a cutoff device according to Embodiment 3 when a short-circuit current is generated ($Fg \geq F$).
Figure 10B:
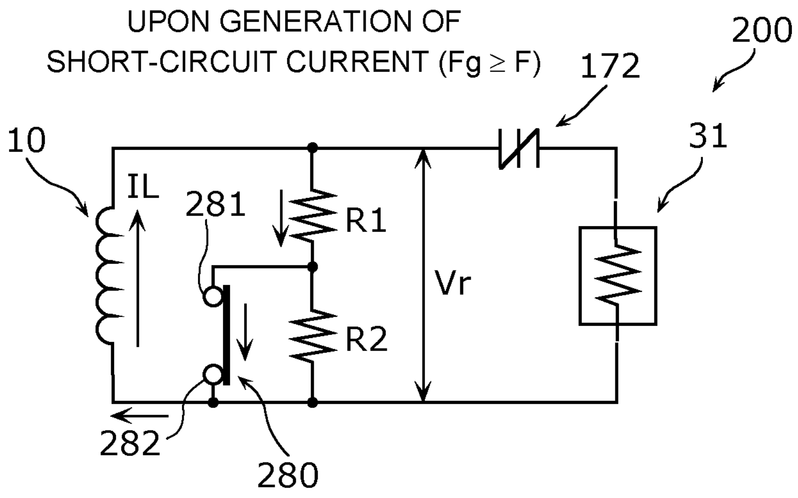
FIG. 10B is a diagram illustrating a path for an induced current in a cutoff device according to Embodiment 3 when a short-circuit current is generated ($Fg \geq F$).

Next, the operation of cutoff device 200 configured as described above will be descried with reference to FIG. 10A to FIG. 11C. First, the operation of cutoff device 200 performed when a short-circuit current flowing to busbar 40 has a small current value will be described with reference to FIG. 10A and FIG. 10B. FIG. 10A is a diagram illustrating the relay included in cutoff device 200 according to the present exemplary embodiment when a short-circuit current is generated (Fg≥F). FIG. 10B is a diagram illustrating a path for the induced current when a short-circuit current is generated (Fg≥F) in cutoff device 200 according to the present exemplary embodiment.

As illustrated in FIG. 10A, when a short-circuit current flows to busbar 40, magnetic flux (a change in the magnetic flux) corresponding to said short-circuit current forms a magnetic circuit by circulating through fixed yoke 286 and movable yoke 284. With this, force of attraction F that attracts movable yoke 284 toward fixed yoke 286 is generated. In the example illustrated in FIG. 10A, the short-circuit current is relatively small and force of attraction Fg≥force of attraction F, and thus movable yoke 284 does not move toward fixed yoke 286.

As illustrated in FIG. 10B, fixed terminals 281, 282 are conductive, and thus induced current IL generated in coil 10 flows to resistor R1 and relay switch 280 in the stated order. At this time, induced current IL barely flows to resistor R2; therefore, voltage Vr does not increase until semiconductor switch 172 turns ON.

Figure 11A:
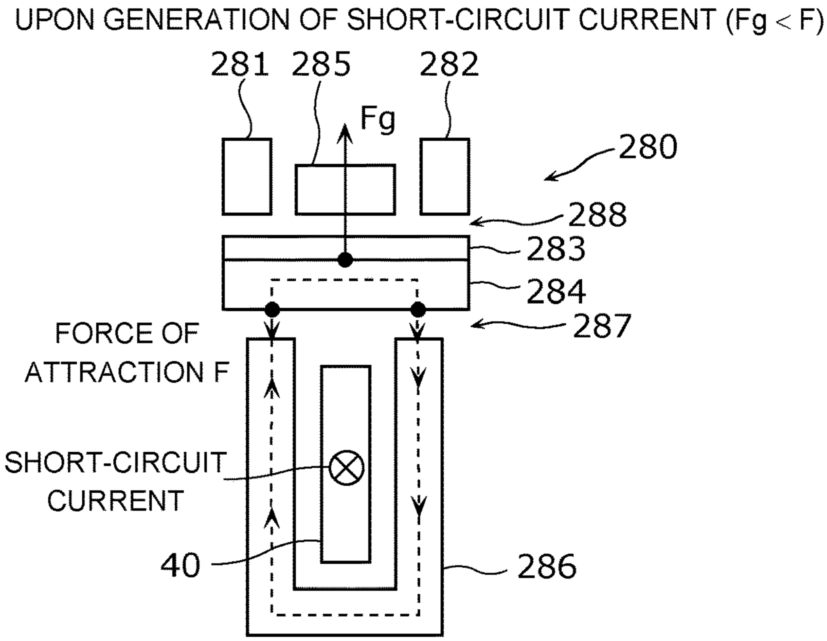
FIG. 11A is a diagram illustrating a relay included in a cutoff device according to Embodiment 3 when a short-circuit current is generated ($Fg < F$).
Figure 11B:
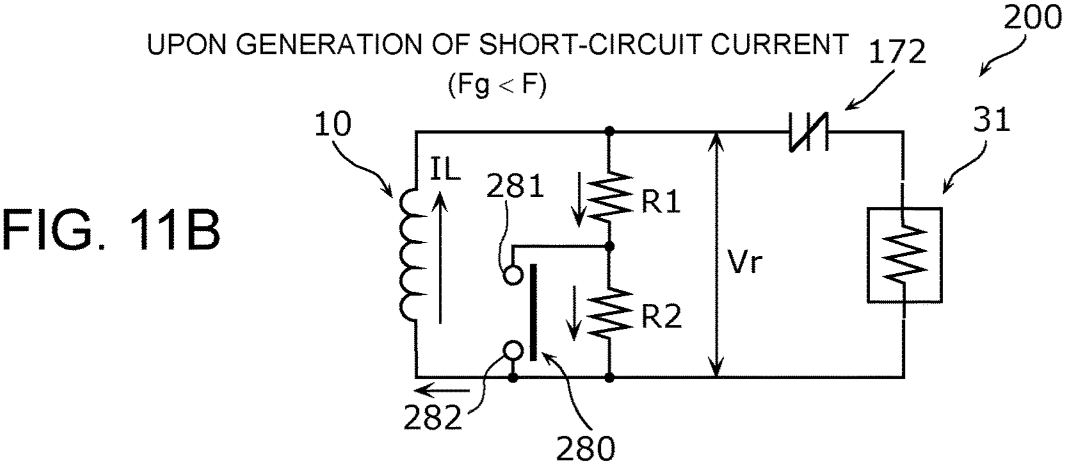
FIG. 11B is a diagram illustrating a path for an induced current in a cutoff device according to Embodiment 3 when a short-circuit current is generated ($Fg < F$).
Figure 11C:
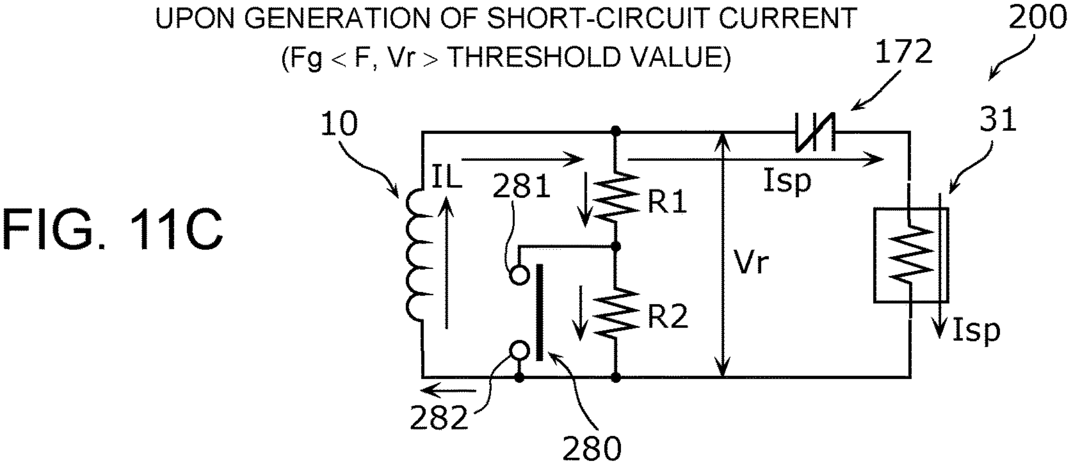
FIG. 11C is a diagram illustrating a path for an induced current in a cutoff device according to Embodiment 3 when a short-circuit current is generated ($Fg < F$, a voltage>a threshold value).

Next, the operation of cutoff device 200 performed when the current value of the short-circuit current flowing to busbar 40 has increased will be described with reference to FIG. 11A to FIG. 11C. FIG. 11A is a diagram illustrating the relay included in cutoff device 200 according to the present exemplary embodiment when a short-circuit current is generated (Fg<F). FIG. 11B is a diagram illustrating a path for the induced current when a short-circuit current is generated (Fg<F) in cutoff device 200 according to the present exemplary embodiment. FIG. 11C is a diagram illustrating a path for the induced current when a short-circuit current is generated (Fg<F, Vr>a threshold value) in cutoff device 200 according to the present exemplary embodiment.

As illustrated in FIG. 11A, when the short-circuit current flowing to busbar 40 increases (rapidly increases), the magnetic flux circulating through fixed yoke 286 and movable yoke 284 increases, and force of attraction F that attracts movable yoke 284 toward fixed yoke 286 increases. Furthermore, when force of attraction Fg<force of attraction F is satisfied, movable yoke 284 moves toward fixed yoke 286. Accordingly, along with fixed yoke 286, copper plate 283 also moves toward fixed yoke 286, and thus gap 288 is formed between fixed terminals 281, 282 and copper plate 283, and fixed terminals 281, 282 become non-conductive. In other words, relay switch 280 transitions from ON to OFF.

As illustrated in FIG. 11B, fixed terminals 281, 282 are not conductive, and thus induced current IL generated in coil 10 flows to resistor R1 and resistor R2 in the stated order. Thus, when relay switch 280 turns OFF, induced current IL flows to resistor R2 as well, and voltage Vr becomes greater than that indicated in FIG. 10B. As a result, voltage Vr becomes greater than or equal to a threshold value (a threshold voltage) at which semiconductor switch 172 turns ON.

As illustrated in FIG. 11C, when voltage Vr>the threshold value is satisfied, semiconductor switch 172 turns ON, and therefore current Isq, which is a portion of induced current IL, is supplied to igniter 31 through semiconductor switch 172.

Embodiment 4

Hereinafter, a cutoff device according to the present exemplary embodiment will be described with reference to FIG. 12 to FIG. 15B. Note that the following description will focus on the differences from Embodiment 2 while omitting or simplifying description of details that are the same as or similar to those described in Embodiment 2.

4-1. Configuration of Cutoff Device

Figure 12:
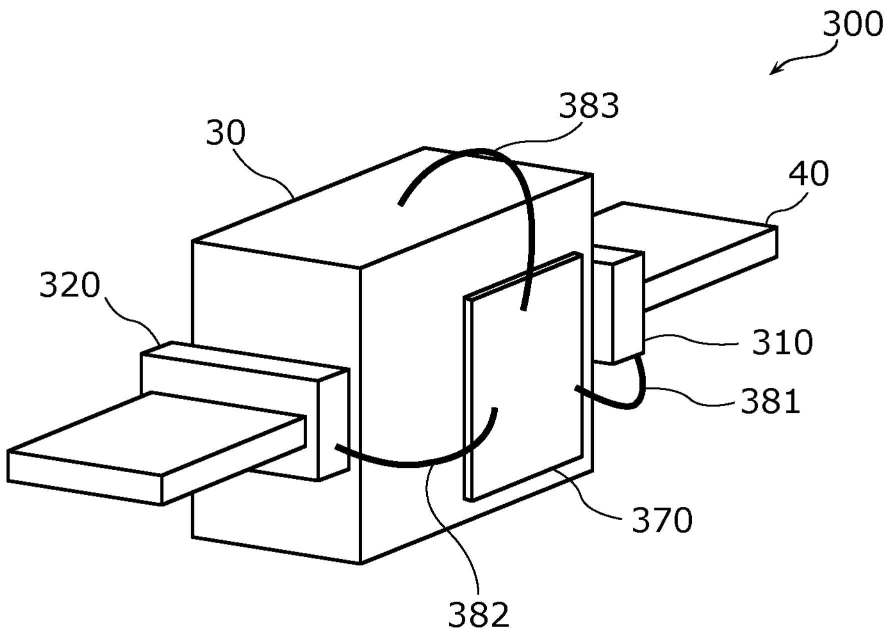
FIG. 12 is a diagram illustrating the configuration of a cutoff device according to Embodiment 4.
Figure 13A:
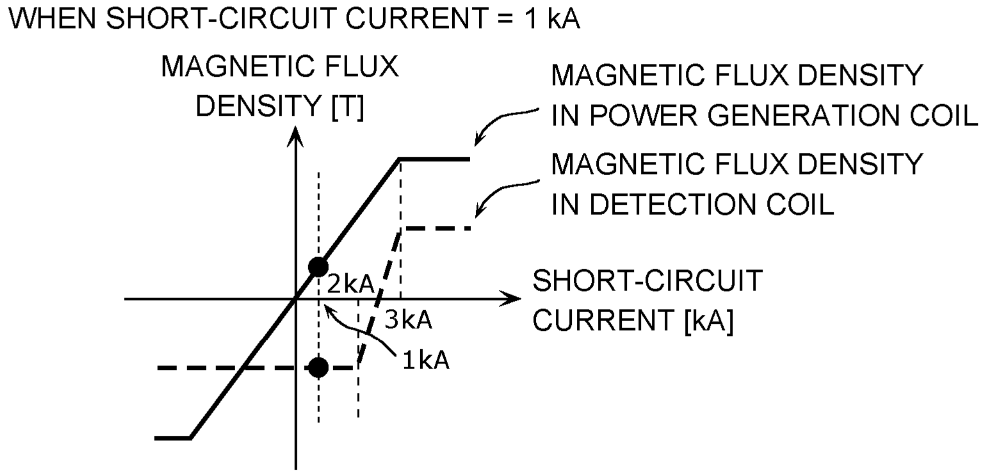
FIG. 13A is a diagram illustrating magnetic flux density when a short-circuit current is 1 kA.
Figure 13B:
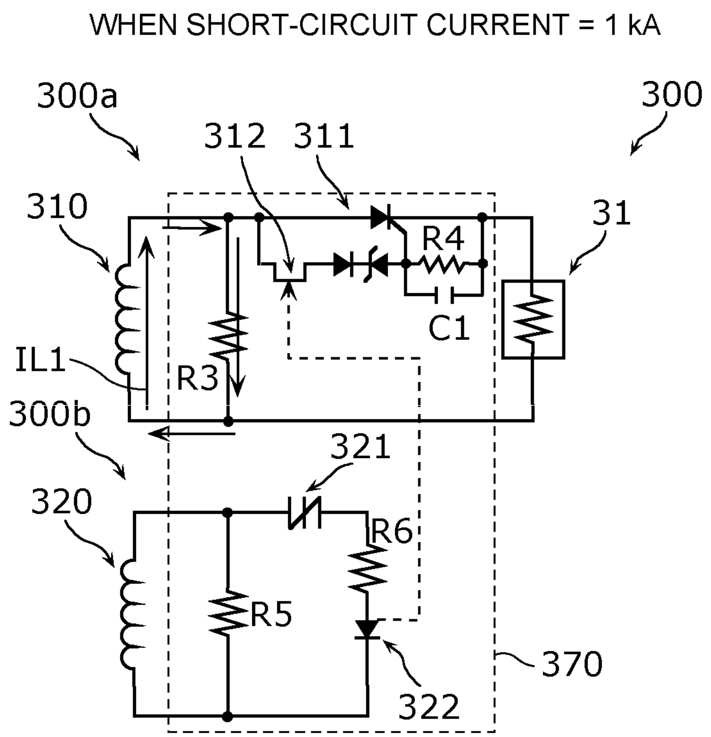
FIG. 13B is a diagram illustrating a path for an induced current in a cutoff device according to Embodiment 4 when a short-circuit current is 1 kA.

First, the configuration of the cutoff device according to the present exemplary embodiment will be described with reference to FIG. 12 and FIG. 13B. FIG. 12 is a diagram illustrating the configuration of cutoff device 300 according to the present exemplary embodiment. FIG. 13B is a diagram illustrating a path for the induced current in cutoff device 300 according to the present exemplary embodiment when the short-circuit current is 1 kA. Cutoff device 300 according to the present exemplary embodiment is different from cutoff device 100 according to Embodiment 2 mainly in that power generation coil 310 that generates a drive current for driving breaker 30 and detection coil 320 that detects an overcurrent flowing to busbar 40 are included. Note that FIG. 13B illustrates the state where the short-circuit current is 1 kA.

As illustrated in FIG. 12, cutoff device 300 includes power generation coil 310, detection coil 320, substrate 370, cables 381 to 383, and breaker 30. In cutoff device 300 according to the present exemplary embodiment, power generation coil 310 and detection coil 320 are positioned forward and backward of breaker 30 through which busbar 40 extends. In other words, power generation coil 310, breaker 30, and detection coil 320 are arranged in the stated order in the direction in which busbar 40 extends. For example, an overcurrent flowing to busbar 40 passes through breaker 30 after passing through power generation coil 310 and passes through detection coil 320 after passing through breaker 30. The same overcurrent flows to power generation coil 310 and detection coil 320. Cables 381 to 383 are one example of the wiring.

Power generation coil 310 and detection coil 320 have different magnetic properties. Power generation coil 310 and detection coil 320 are different in at least one of the magnetic permeability and the magnetic saturation characteristics.

Power generation coil 310 is a coil that is connected to igniter 31 via semiconductor switch 311 (refer to FIG. 13B) and generates a drive current for driving igniter 31. For example, power generation coil 310 is configured so as to have higher magnetic permeability and higher magnetic flux density for magnetic saturation than detection coil 320. A yoke (for example, a gap core) surrounding busbar 40 may be inserted through power generation coil 310, for example.

Power generation coil 310 is disposed near busbar 40 so that magnetic flux generated when an overcurrent flows to busbar 40 passes through power generation coil 310. For example, power generation coil 310 may be in the shape of a loop surrounding busbar 40 or a looped yoke surrounding busbar 40 may be disposed inside power generation coil 310. Power generation coil 310 is one example of the first coil.

Detection coil 320 is a coil for driving semiconductor switch 321 connected between power generation coil 310 and igniter 31. Detection coil 320 includes a member in which a yoke and a magnet are embedded, and the magnetic flux of detection coil 320 changes in a certain current range (for example, 2 kA to 3 kA). Therefore, when an electric current in said certain current range flows to busbar 40, the induced current can be generated in detection coil 320.

Detection coil 320 is disposed near busbar 40 so that magnetic flux generated when an overcurrent flows to busbar 40 passes through detection coil 320. For example, detection coil 320 may be in the shape of a loop surrounding busbar 40 or a looped yoke surrounding busbar 40 may be disposed inside detection coil 320. Detection coil 320 is one example of the second coil.

Note that the magnetic properties of power generation coil 310 and detection coil 320 are not limited to those mentioned above.

Note that the following will describe the case where the magnetic properties of power generation coil 310 and detection coil 320 are set so that when a short-circuit current of 1 kA flows to busbar 40, an induced current of 1.75 A is generated in power generation coil 310 and an induced current of 10 mA is generated in detection coil 320. The induced current generated in power generation coil 310 is one example of the first induced current, and the induced current generated in detection coil 320 is one example of the second induced current.

Substrate 370, which is connected to power generation coil 310 via cable 381, connected to detection coil 320 via cable 382, and connected to igniter 31 of breaker 30 via cable 383, is provided in order to switch the electrical connection between power generation coil 310 and igniter 31 ON and OFF using the induced current generated in detection coil 320. On substrate 370, mounted is an electronic component for electrically connecting power generation coil 310 and igniter 31 when the induced current generated in detection coil 320 exceeds a predetermined current value.

Note that power generation coil 310, detection coil 320, and substrate 370 may be fixed to the casing of breaker 30, for example.

As illustrated in FIG. 13B, the circuit configuration of cutoff device 300 includes power generation coil 310, resistors R3, R5, R6, semiconductor switches 311, 321, phototransistor 312, igniter 31, detection coil 320, and light-emitting diode 322. For example, resistors R3, R5, R6, semiconductor switches 311, 321, and phototransistor 312 are mounted on substrate 370.

Resistor R3 is connected to power generation coil 310. Both ends of resistor R3 are connected to both ends of power generation coil 310. The resistance value of resistor R3 is less than the resistance value of resistor R5, for example. The resistance value of resistor R3 is 20 Ω, for example, but this is not limiting. Resistor R3 is one example of the first resistor.

Semiconductor switch 311 is a switch that is connected in series between power generation coil 310 and igniter 31 and switches between supplying and not supplying the induced current generated in power generation coil 310 to igniter 31. Semiconductor switch 311 is a Form A contact switch which is OFF during normal operation and turns ON when an overcurrent occurs. In the present exemplary embodiment, semiconductor switch 311 includes a switch including a thyristor; specifically, semiconductor switch 311 includes a thyristor, a diode, a Zener diode, resistor R4, and capacitor C1.

Phototransistor 312, which has one of the collector and the emitter connected to power generation coil 310 and the other of the collector and the emitter connected to the anode of the diode of semiconductor switch 311, switches between conduction and non-conduction between power generation coil 310 and the diode. When light from light-emitting diode 322 enters phototransistor 312, phototransistor 312 transitions from OFF to ON. This means that phototransistor 312 turns ON with the light from light-emitting diode 322. For example, a photocoupler is formed to include phototransistor 312 (a light-receiving device) and light-emitting diode 322 (a light-emitting device). The photocoupler is one example of the switching unit.

Note that the switching unit is not limited to including phototransistor 312; it is sufficient that the switching unit transition between ON and OFF according to a signal that is output using the induced current generated in detection coil 320. The switching unit may include a field effect transistor (FET), for example.

Resistor R5, which is connected in parallel with semiconductor switch 321, is provided in order to turn ON semiconductor switch 321 when a predetermined overcurrent flows to busbar 40. Both ends of resistor R5 are connected to both ends of detection coil 320. The resistance value of resistor R5 is greater than the resistance value of resistor R3, for example. The resistance value of resistor R5 is set to a resistance value at which when induced current IL2 corresponding to the predetermined overcurrent is generated in detection coil 320, semiconductor switch 321 can turn ON.

Semiconductor switch 321 is a switch that is connected in series between detection coil 320 and light-emitting diode 322 and switches between supplying and not supplying the induced current generated in detection coil 320 to light-emitting diode 322. Semiconductor switch 321 is a Form A contact switch which is OFF during normal operation and turns ON when an overcurrent occurs. Semiconductor switch 321 includes a semiconductor switch different from that included in semiconductor switch 311; in the present exemplary embodiment, semiconductor switch 321 includes the SIDAC (registered trademark). In the present exemplary embodiment, semiconductor switch 321 turns ON when the induced current generated in detection coil 320 exceeds a predetermined value (corresponding to when voltage Vr generated at resistor R5 exceeds a predetermined voltage (for example, 10 V)). Semiconductor switch 321 is one example of the second semiconductor switch.

Resistor R6 is connected in series with light-emitting diode 322 in order to limit the electric current flowing to light-emitting diode 322. Resistor R6 is determined, as appropriate, according to the electric current allowed to flow to light-emitting diode 322. In the example illustrated in FIG. 13B, resistor R6 is connected on the side on which the anode of light-emitting diode 322 is located, but may be connected on the side on which the cathode of light-emitting diode 322 is located.

Light-emitting diode 322 is connected to detection coil 320 via semiconductor switch 321, and emits light for turning ON phototransistor 312 using the induced current generated in detection coil 320. In other words, light-emitting diode 322 is supplied with the induced current from detection coil 320 and thus emits light. The light is one example of the signal for turning phototransistor 312 ON, and light-emitting diode 322 is one example of the output unit.

Note that phototransistor 312, detection coil 320, semiconductor switch 321, and light-emitting diode 322 constitute a switching circuit that switches between conduction and non-conduction between power generation coil 310 and semiconductor switch 311 (specifically, the diode of semiconductor switch 311). The switching circuit and semiconductor switch 311 constitute a switch that switches between conduction and non-conduction between power generation coil 310 and igniter 31. Power generation coil 310, resistor R3, semiconductor switch 311, and igniter 31 constitute power generation circuit 300*a,* and detection coil 320, resistors R5, R6, semiconductor switch 321, and light-emitting diode 322 constitute detection circuit 300*b*.

4-2. Operation of Cutoff Device

Next, the operation of cutoff device 300 configured as described above will be descried with reference to FIG. 13A to FIG. 15B. First, the operation of cutoff device 300 performed when a short-circuit current flowing to busbar 40 has a small current value will be described with reference to FIG. 13A and FIG. 13B. FIG. 13A is a diagram illustrating magnetic flux density when the short-circuit current is 1 kA. The magnetic properties of power generation coil 310 and detection coil 320 are set so as to satisfy the relationship illustrated in FIG. 13A.

As illustrated in FIG. 13A, when the short-circuit current is 1 kA, the magnetic flux density in power generation coil 310 changes, and the magnetic flux density in detection coil 320 is constant.

As illustrated in FIG. 13B, induced current IL1 is generated in power generation coil 310, the magnetic flux density of which changes, while no induced current is generated in detection coil 320, the magnetic flux density of which does not change. This means that since semiconductor switch 311 remains OFF, the induced current is not supplied to igniter 31. Furthermore, since phototransistor 312 is OFF, it can be said that the threshold value of semiconductor switch 311 is ∞V.

Figure 14A:
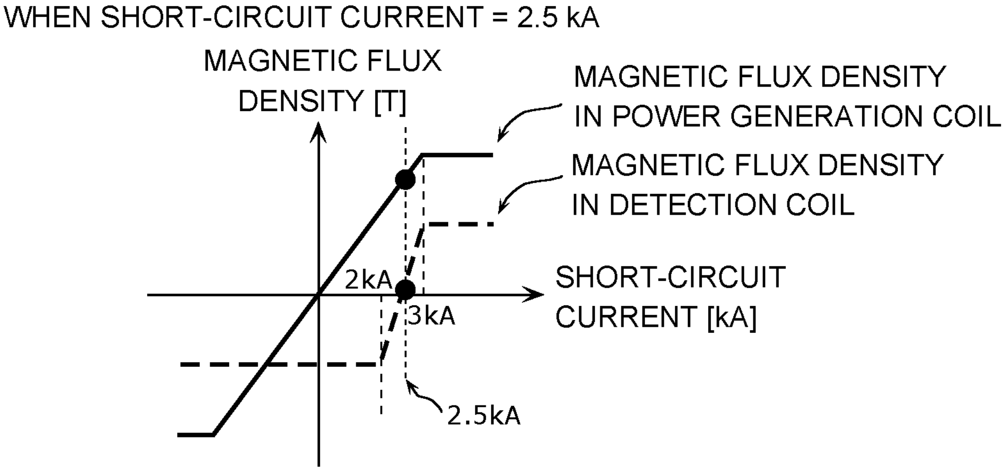
FIG. 14A is a diagram illustrating magnetic flux density when a short-circuit current is 2.5 kA.
Figure 14B:
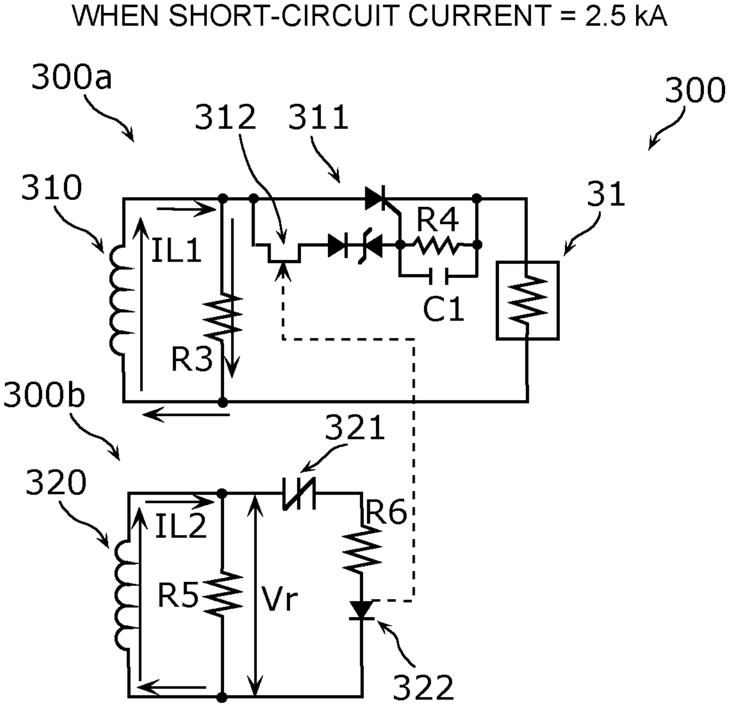
FIG. 14B is a diagram illustrating a path for an induced current in a cutoff device according to Embodiment 4 when a short-circuit current is 2.5 kA.

Next, the operation of cutoff device 300 performed when the short-circuit current flowing to busbar 40 has increased will be described with reference to FIG. 14A and FIG. 14B. FIG. 14A is a diagram illustrating magnetic flux density when the short-circuit current is 2.5 kA. FIG. 14B is a diagram illustrating a path for the induced current in cutoff device 300 according to the present exemplary embodiment when the short-circuit current is 2.5 kA.

As illustrated in FIG. 14A, when the short-circuit current is 2.5 kA, the magnetic flux density in power generation coil 310 and the magnetic flux density in detection coil 320 are changing.

As illustrated in FIG. 14B, induced current IL1 is generated in power generation coil 310, and induced current IL2 is generated in detection coil 320. At this time, when voltage Vr generated at resistor R5 is less than a threshold value (a threshold voltage) of semiconductor switch 321, semiconductor switch 311 remains OFF, and thus the induced current is not supplied to igniter 31. Note that induced current IL1 illustrated in FIG. 14B has a current value greater than that of induced current IL1 indicated in FIG. 13B, for example.

Figure 15A:
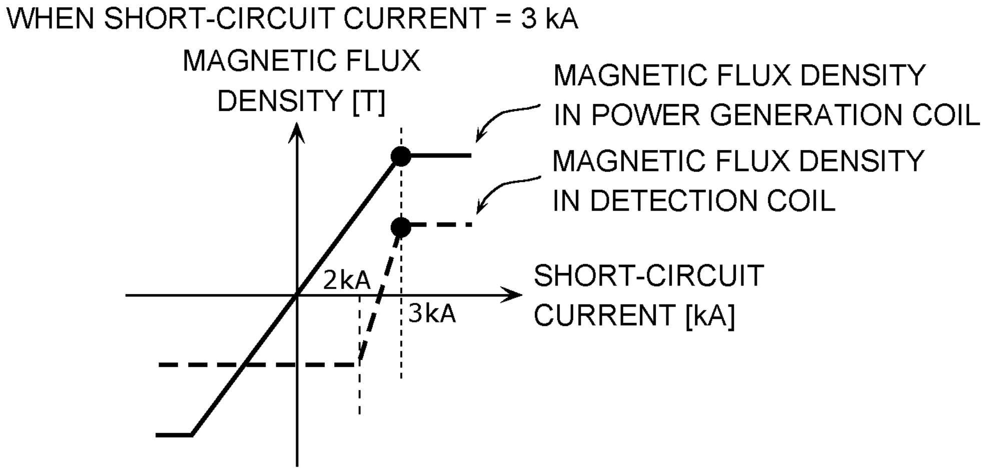
FIG. 15A is a diagram illustrating magnetic flux density when a short-circuit current is 3 kA.
Figure 15B:
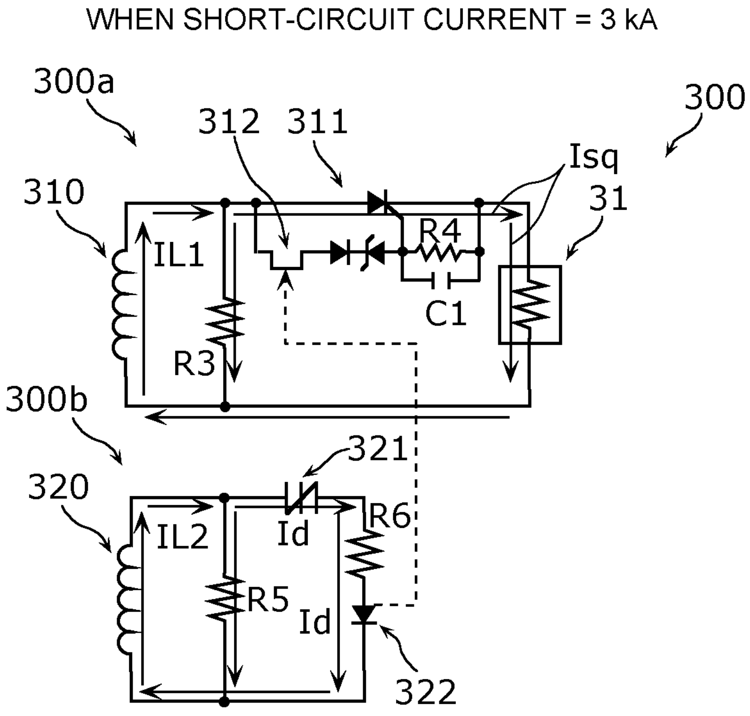
FIG. 15B is a diagram illustrating a path for an induced current in a cutoff device according to Embodiment 4 when a short-circuit current is 3 kA.

Next, the operation of cutoff device 300 performed when the short-circuit current flowing to busbar 40 has increased further will be described with reference to FIG. 15A and FIG. 15B. FIG. 15A is a diagram illustrating magnetic flux density when the short-circuit current is 3 kA. FIG. 15B is a diagram illustrating a path for the induced current in cutoff device 300 according to the present exemplary embodiment when the short-circuit current is 3 kA.

As illustrated in FIG. 15A, when the short-circuit current is 3 kA, the magnetic flux density in power generation coil 310 and the magnetic flux density in detection coil 320 have reached the maximum value.

As illustrated in FIG. 15B, induced current IL1 is generated in power generation coil 310, and induced current IL2 is generated in detection coil 320. At this time, voltage Vr generated at resistor R5 becomes greater than or equal to the threshold value of semiconductor switch 321, light-emitting diode 322 emits light, thus phototransistor 312 transitions from non-conduction to conduction, and induced current IL1 flows to the diode of semiconductor switch 311, causing semiconductor switch 311 to transition from OFF to ON; thus, current Isq, which is a portion of induced current IL1, is supplied to igniter 31. Igniter 31 is then ignited with said current Isq. Note that induced current IL1 indicated in FIG. 15B has a current value greater than that of induced current IL1 indicated in FIG. 14B, for example, and induced current IL2 indicated in FIG. 15B has a current value greater than or equal to that of induced current IL2 indicated in FIG. 14B, for example.

Note that since phototransistor 312 turns ON, it can be said that the threshold value of semiconductor switch 311 is the threshold value of said semiconductor switch 311 itself; for example, the threshold value of semiconductor switch 311 is 20 V.

As described above, cutoff device 300 according to the present exemplary embodiment causes detection coil 320 to generate induced current IL2 by the magnetic flux in busbar 40, thereby causes semiconductor switch 311 to turn ON, and thus drives breaker 30 with induced current IL1 generated in power generation coil 310.

Embodiment 5

Hereinafter, a cutoff device according to the present exemplary embodiment will be described with reference to FIG. 16 to FIG. 19. Note that the following description will focus on the differences from Embodiment 3 while omitting or simplifying description of details that are the same as or similar to those described in Embodiment 3.

5-1. Configuration of Cutoff Device

Figure 16:
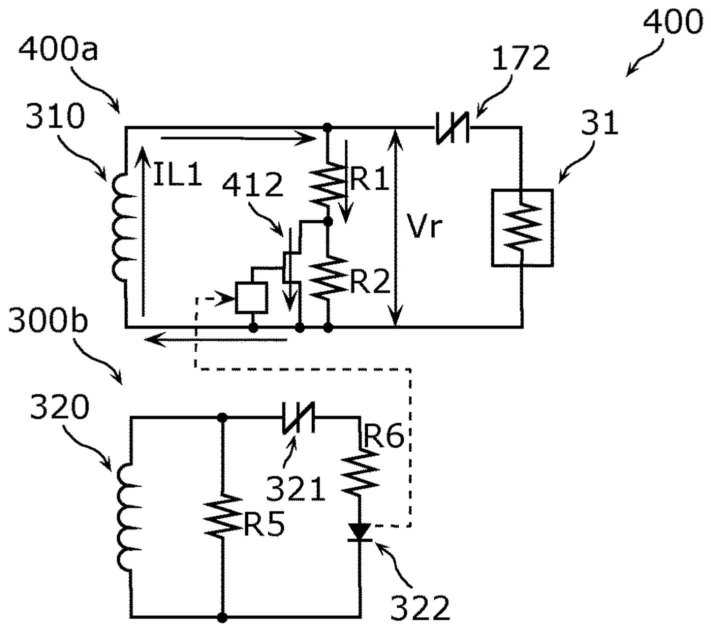
FIG. 16 is a diagram illustrating a path for an induced current in a cutoff device according to Embodiment 5 when a short-circuit current is 1 kA.

First, the configuration of the cutoff device according to the present exemplary embodiment will be described with reference to FIG. 16. FIG. 16 is a diagram illustrating a path for the induced current in cutoff device 400 according to the present exemplary embodiment when the short-circuit current is 1 kA. FIG. 16 illustrates the circuit configuration of cutoff device 400. Cutoff device 400 according to the present exemplary embodiment is different from cutoff device 200 according to Embodiment 3 mainly in that instead of relay switch 280, phototransistor 412 and detection circuit 300*b* (a circuit including detection coil 320) that outputs a signal for turning phototransistor 412 ON are included. Note that FIG. 16 illustrates the state where the short-circuit current is 1 kA.

As illustrated in FIG. 16, cutoff device 400 includes power generation coil 310, detection coil 320, a substrate (not illustrated in the drawings), a cable (not illustrated in the drawings), and breaker 30. Note that the functions and positions of power generation coil 310, detection coil 320, the substrate, and the cable may be the same as those in cutoff device 300 according to Embodiment 4, and thus description thereof will be omitted.

On the substrate, mounted is an electronic component (for example, resistors R1, R2, R5, and R6, light-emitting diode 322, semiconductor switches 172, 321, and phototransistor 412) for electrically connecting power generation coil 310 and breaker 30 when detection circuit 300*b* detects an overcurrent greater than or equal to a predetermined level. The induced current generated in power generation coil 310 is supplied to the substrate, and when detection circuit 300*b* detects an overcurrent greater than or equal to the predetermined level, detection coil 320 and the electronic component supply, to breaker 30, the induced current supplied from power generation coil 310.

Phototransistor 412 has one of the collector and the emitter connected to the other end of resistor R1 (the end thereof on the resistor R2 side) and one end of resistor R2 (the end thereof on the resistor R1 side) and the other of the collector and the emitter connected to the other end of resistor R2. Phototransistor 412 is connected in parallel with resistor R2. When light from light-emitting diode 322 enters phototransistor 412, phototransistor 412 transitions from ON to OFF. This means that phototransistor 412 turns OFF with the light from light-emitting diode 322. For example, a photocoupler is formed to include phototransistor 412 (a light-receiving device) and light-emitting diode 322 (a light-emitting device). In the present exemplary embodiment, the photocoupler is a Form B contact switch. The photocoupler is one example of the switching unit.

Note that the switching unit is not limited to including phototransistor 412; it is sufficient that the switching unit transition between ON and OFF according to a signal that is output using the induced current generated in detection coil 320.

Note that it is sufficient that phototransistor 412 be connected in parallel with one of resistor R1 and resistor R2.

Note that phototransistor 412, detection coil 320, semiconductor switch 321, and light-emitting diode 322 constitute a switching circuit that switches between conduction and non-conduction of an electric current path connected in parallel with resistor R2. It can be said that the switching circuit is a circuit for switching semiconductor switch 172 ON and OFF. The switching circuit may include resistors R1, R2. Power generation coil 310, resistors R1, R2, semiconductor switch 172, phototransistor 412, and igniter 31 constitute power generation circuit 400*a*.

Light-emitting diode 322 is connected to detection coil 320 via semiconductor switch 321, and emits light for turning phototransistor 412 OFF using the induced current generated in detection coil 320. In other words, when the induced current generated in detection coil 320 exceeds a predetermined value, light-emitting diode 322 is supplied with the induced current from detection coil 320 and thus emits light. The light is one example of the signal for turning phototransistor 412 OFF, and light-emitting diode 322 is one example of the output unit.

5-2. Operation of Cutoff Device

Next, the operation of cutoff device 400 configured as described above will be descried with reference to FIG. 16 to FIG. 19. First, the operation of cutoff device 400 performed when the short-circuit current flowing to busbar 40 is low will be described with reference to FIG. 16. Assume that the magnetic properties of power generation coil 310 and detection coil 320 are the same as those in Embodiment 4.

As illustrated in FIG. 16, induced current ILI is generated in power generation coil 310, the magnetic flux density of which changes when the short-circuit current is 1 kA, while no induced current is generated in detection coil 320, the magnetic flux density of which does not change when the short-circuit current is 1 kA. This means that since phototransistor 412 remains ON, induced current IL1 flows through resistor R1 and phototransistor 412. At this time, almost no current flows to resistor R2; therefore, voltage Vr is low and semiconductor switch 172 is OFF, meaning that the induced current is not supplied to igniter 31.

Figure 17:
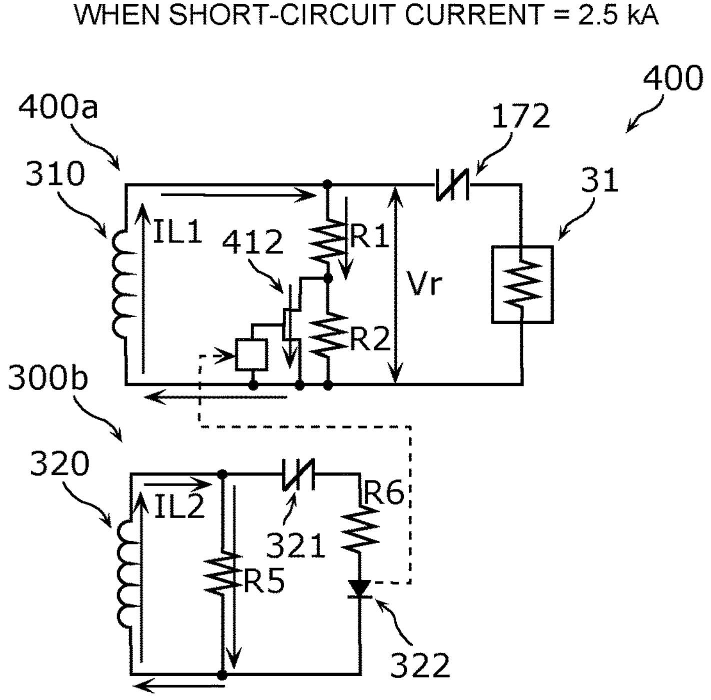
FIG. 17 is a diagram illustrating a path for an induced current in a cutoff device according to Embodiment 5 when a short-circuit current is 2.5 kA.

Next, the operation of cutoff device 400 performed when the short-circuit current flowing to busbar 40 has increased will be described with reference to FIG. 17. FIG. 17 is a diagram illustrating a path for the induced current in cutoff device 400 according to the present exemplary embodiment when the short-circuit current is 2.5 kA.

As illustrated in FIG. 17, induced current ILI is generated in power generation coil 310, the magnetic flux density of which changes when the short-circuit current is 2.5 kA, and induced current IL2 is generated in detection coil 320. At this time, when voltage Vr generated at resistor R5 is less than the threshold value of semiconductor switch 321, phototransistor 412 remains ON, and thus the induced current is not supplied to igniter 31. Note that induced current IL1 illustrated in FIG. 17 has a current value greater than that of induced current IL1 indicated in FIG. 16, for example.

Figure 18:
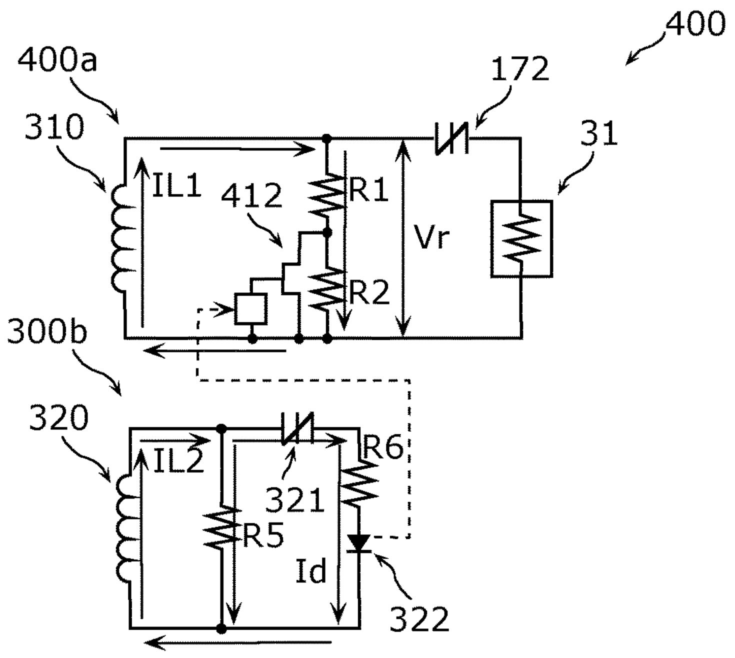
FIG. 18 is a diagram illustrating a path for an induced current in a cutoff device according to Embodiment 5 when a short-circuit current is 3 kA.
Figure 19:
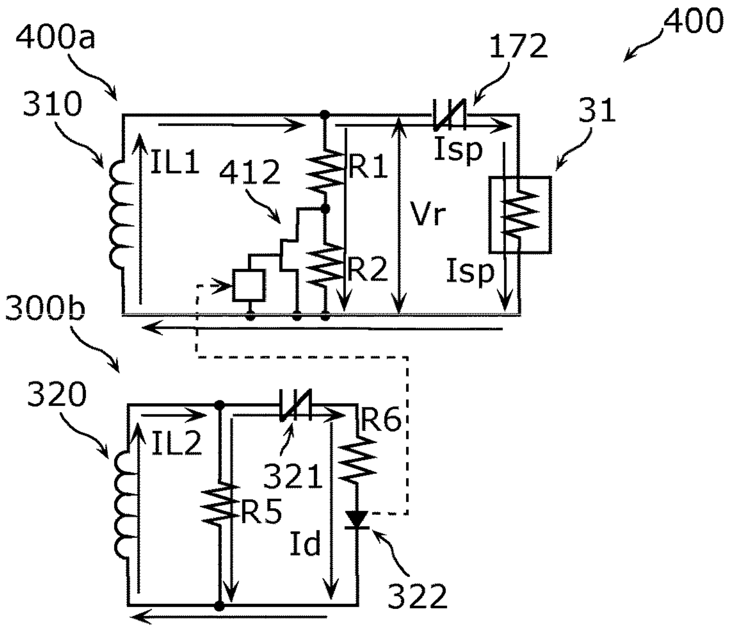
FIG. 19 is a diagram illustrating a path for an induced current in a cutoff device according to Embodiment 5 when a short-circuit current is 3 kA and a voltage>a threshold value is true.

Next, the operation of cutoff device 400 performed when the short-circuit current flowing to busbar 40 has increased further will be described with reference to FIG. 18 and FIG. 19. FIG. 18 is a diagram illustrating a path for the induced current in cutoff device 400 according to the present exemplary embodiment when the short-circuit current is 3 kA. FIG. 19 is a diagram illustrating a path for the induced current in cutoff device 400 according to the present exemplary embodiment when the short-circuit current is 3 kA and voltage Vr>the threshold value is true.

As illustrated in FIG. 18, induced current IL1 is generated in power generation coil 310, and induced current IL2 is generated in detection coil 320. At this time, when voltage Vr generated at resistor R5 becomes greater than or equal to the threshold voltage (for example, 20 V) of semiconductor switch 321, light-emitting diode 322 is supplied with current Id, which is a portion of induced current IL2, and thus emits light, causing phototransistor 412 to transition from ON to OFF. This allows induced current IL1 generated in power generation coil 310 to pass through resistors R1, R2, and voltage Vr becomes greater than voltage Vr indicated in FIG. 18. As a result, voltage Vr becomes greater than or equal to a threshold value at which semiconductor switch 172 turns ON.

As illustrated in FIG. 19, when voltage Vr>the threshold value is satisfied, semiconductor switch 172 turns ON, and therefore current Isq, which is a portion of induced current IL1, is supplied to igniter 31 through semiconductor switch 172.

As described above, cutoff device 400 according to the present exemplary embodiment causes detection coil 320 to generate induced current IL2 by the magnetic flux in busbar 40, thereby causes semiconductor switch 172 to turn ON, and thus drives breaker 30 with induced current IL1 generated in power generation coil 310.

Embodiment 6

Hereinafter, a cutoff device according to the present exemplary embodiment will be described with reference to FIG. 20A. Note that the following description will focus on the differences from Embodiment 2 described with reference to FIG. 4 to FIG. 7 while omitting or simplifying description of details that are the same as or similar to those described in Embodiment 2.

6-1. Configuration of Cutoff Device

First, the configuration of the cutoff device according to Embodiment 6 will be described with reference to FIG. 20A. FIG. 20A is a diagram illustrating one example of the circuit configuration of cutoff device 500A according to Embodiment 6.

Cutoff device 500A is different from cutoff device 100 according to Embodiment 2 mainly in that diode 510, capacitor 520, resistor 530, and semiconductor switch 540 are included.

Coil 10 is electrically connected to igniter 31 via semiconductor switch 172 and semiconductor switch 540. Furthermore, coil 10 is electrically connected to semiconductor switch 540 via semiconductor switch 172.

Each of resistor 171 and diode 510 has a connection point between coil 10 and semiconductor switch 172. One end of resistor 171 is electrically connected between coil 10 and semiconductor switch 172. The cathode of diode 510 is connected to the connection point between coil 10 and resistor 171. In other words, the cathode (the connection point) of diode 510 is connected at a point located closer to coil 10 than one end (the connection point) of resistor 171.

Each of capacitor 520 and resistor 530 has a connection point between semiconductor switch 172 and semiconductor switch 540. One end of capacitor 520 is electrically connected between semiconductor switch 172 and semiconductor switch 540. One end of resistor 530 is electrically connected between the connection point of capacitor 520 and semiconductor switch 540. In other words, the connection point of resistor 530 is located closer to igniter 31 than the connection point of capacitor 520.

Here, each of semiconductor switch 172 and semiconductor switch 540 is a switch that turns ON when a voltage exceeding a predetermined value (a threshold voltage) is applied thereto. For example, a thyristor and a SIDAC (registered trademark) are used as semiconductor switch 172 and semiconductor switch 540.

When the voltage applied to semiconductor switch 172 exceeds a predetermined value, semiconductor switch 172 allows conduction between coil 10 and capacitor 520. When the voltage applied to semiconductor switch 540 exceeds a predetermined value, semiconductor switch 540 allows conduction between capacitor 520 and igniter 31. Here, the threshold voltage of semiconductor switch 172 is set greater than or equal to the threshold voltage of semiconductor switch 540.

6-2. Operation of Cutoff Device

Figure 20A:
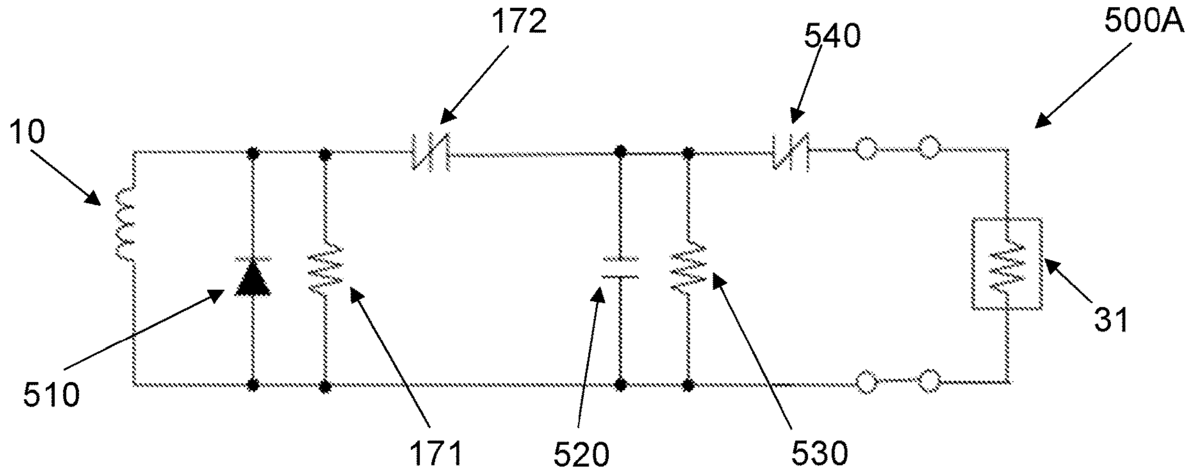
FIG. 20A is a diagram illustrating one example of the circuit configuration of a cutoff device according to Embodiment 6.

Next, the operation of cutoff device 500A configured as illustrated will be descried with reference to FIG. 20A. Furthermore, FIG. 3C will be referred to as an exemplary configuration for describing generation of induced power in coil 10.

Busbar 40 generates a magnetic field around busbar 40 (or changes the magnetic field around busbar 40) when an electric current flows to busbar 40. Thus, coil 10 generates an induced electromotive force according to a change in the magnetic flux that passes through coil 10.

When the voltage of the induced power generated by coil 10 is less than or equal to the threshold voltage of semiconductor switch 172, the induced power generated by coil 10 is consumed by resistor 171. On the other hand, when the voltage of the induced power generated by coil 10 exceeds the threshold value of semiconductor switch 172, the induced power generated by coil 10 is stored in capacitor 520.

When the voltage of the power stored in capacitor 520 is less than or equal to the threshold voltage of semiconductor switch 540, the induced power generated by coil 10 is consumed by resistor 530. When the voltage of the power (the induced electromotive force of coil 10) stored in capacitor 520 is exceeds the threshold voltage of semiconductor switch 540, the power stored in capacitor 520 is supplied to igniter 31.

Cutoff device 500A is configured as described above. The induced power generated by coil 10 is stored in capacitor 520 and then supplied to igniter 31. Therefore, even when busbar 40 temporarily generates a strong magnetic field with an electric current flowing to busbar 40 affected by noise or the like, the induced electromotive force generated by coil 10 is not likely to be supplied to igniter 31. Thus, cutoff device 500A can prevent malfunction due to the effects of noise or the like and reduce degradation of a pyrotechnic composition for breaker 30 (igniter 31), for example.

In addition, in cutoff device 500A, the threshold voltage of semiconductor switch 172 is set greater than or equal to the threshold voltage of semiconductor switch 540. Therefore, the resistance value of resistor 171 can be set high, and heat generation by coil 10 (loss of the induced electromagnetic force generated by coil 10) can be reduced.

Note that cutoff device 500A may be configured such that the threshold voltage of semiconductor switch 172 is lower than the threshold voltage of semiconductor switch 540. In this case, voltage variations during non-operation can be reduced.

Figure 20B:
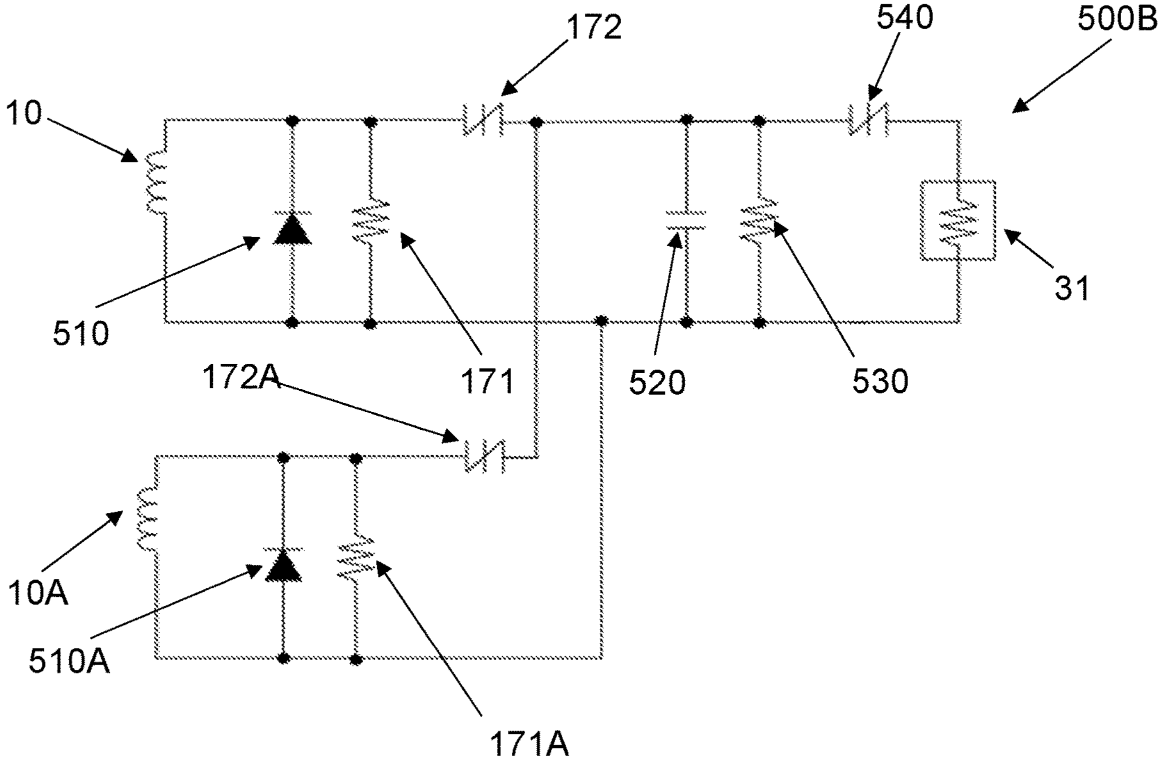
FIG. 20B is a diagram illustrating one example of the circuit configuration of a cutoff device according to a variation of Embodiment 6.

Cutoff device 500B illustrated in FIG. 20B may be configured. FIG. 20B is a diagram illustrating one example of the circuit configuration of a cutoff device according to a variation of Embodiment 6.

Cutoff device 500B further includes, in addition to coil 10, coil 10A that generates power by the magnetic field of busbar 40. Furthermore, cutoff device 500B is configured such that capacitor 520 is charged with the power from coil 10 and coil 10A. Thus, when the amount of power generation by coil 10 is deficient, cutoff device 500B can make up the deficiency using the amount of power generation by coil 10A. Furthermore, when coil 10 malfunctions and fails to generate power, cutoff device 500B can operate with the power generated by coil 10A.

Note that in cutoff device 500B, semiconductor switch 172A is preferably provided between coil 10A and capacitor 520. Semiconductor switch 172A is a switch that turns ON when a voltage exceeding a predetermined value (a threshold voltage) is applied thereto. For example, a thyristor or a SIDAC (registered trademark) is used as semiconductor switch 172A.

Furthermore, semiconductor switch 172A is preferably configured to have a threshold voltage greater than or equal to the threshold voltage of semiconductor switch 540 for substantially the same reason as for semiconductor switch 172. Note that semiconductor switch 172A may be configured to have a threshold voltage greater than or equal to the threshold voltage of semiconductor switch 540 for substantially the same reason as for semiconductor switch 172.

Moreover, when the cutoff device has the configuration illustrated in FIG. 20B, it is preferable that cutoff device 500B further include diode 510A and resistor 171A.

Other Exemplary Embodiments

The cutoff devices, etc., according to one or more aspects have been described thus far based on the exemplary embodiments, but the present disclosure is not limited to these exemplary embodiments. Various modifications to the present exemplary embodiments and forms configured by combining structural elements in different exemplary embodiments that can be conceived by those skilled in the art may be included within the present disclosure as long as these do not depart from the essence of the present disclosure.

For example, although the above exemplary embodiments, etc., have thus far described examples of a cutoff device including a coil, wiring or a cable, and a breaker, it is not essential that the breaker be included. The present disclosure may be embodied as a driving device that includes a coil and wiring and drives a breaker with an induced current generated in the coil.

The above exemplary embodiments have thus far described, as an example, cutoff device 1, etc., in which coil 10 or the like generates induced current by the magnetic field generated in busbar 40 and which includes breaker 30 that operates igniter 31 using said induced current. However, cutoff device 1, etc., may include, for example, an electromagnetic relay instead of breaker 30. The electromagnetic relay operates using the induced current. For example, the electromagnetic relay includes: a fixed terminal; a movable contactor that moves into or out of contact with the fixed terminal; and a drive coil that causes the movable contactor to operate; the movable contactor operates when the induced current generated by coil 10 or the like is supplied to the drive coil of the electromagnetic relay.

The induced current may be used, for example, to drive devices such as a light-emitting device and a sounding device for reporting that an overcurrent has occurred. For example, the driving device may be a driving device that drives a device and includes: a coil in which an induced current corresponding to an electric current flowing through an electrical path is generated; and wiring that electrically connects the coil and the device. The driving device drives the device with the induced current generated in the coil. Note that the verb "drive" in this case refers to causing the light-emitting device to emit light or causing the sounding device to output sound, for example.

The cutoff devices according to the above exemplary embodiments, etc., may be used, for example, to interrupt an overcurrent in a power storage system, a power transmission system, and the like.

Embodiments 3 and 5 discussed above have described the examples in which resistor R1 and resistor R2 are provided, but this is not limiting; resistor R1 does not need to be provided.

Embodiments 4 and 5 discussed above have described the examples in which the power generation coil and the detection coil have different magnetic properties, but this is not limiting; the power generation coil and the detection coil may have the same magnetic properties.

Industrial Applicability

The present disclosure is useful for a cutoff device, etc., that interrupts an electrical path when an overcurrent occurs.

REFERENCE SIGNS LIST

- 1, 100, 200, 300, 400, 500A, 500B cutoff device
- 10 coil (first coil)
- 20 wiring
- 30 breaker
- 31 igniter
- 40 busbar
- 50 coil bobbin
- 51, 63*a* through-hole
- 61, 62, 63, 64 yoke
- 62*a* protruding portion
- 64*a*, 68*b* magnetic gap (open portion)
- 64*b*, 64*c* end
- 65*a*, 67*c*, 68*a* magnet
- 66*a*, 67*a*, 67*b* resin member (non-magnetic material)
- 170, 270, 370 substrate
- resistor 171, R1, R2, R3, R4, R5, R6
- 172, 173, 311 semiconductor switch (first semiconductor switch)
- 181 first wiring
- 182 second wiring
- 280 relay switch
- 281, 282 fixed terminal

283 copper plate
284 movable yoke
285 magnet
286 fixed yoke
287, 288 gap
291, 292, 381, 382, 383 cable (wiring)
300*a*, 400*a* power generation circuit
300*b* detection circuit
310 power generation coil (first coil)
312, 412 phototransistor (switching unit)
320 detection coil (second coil)
321 semiconductor switch (second semiconductor switch)
322 light-emitting diode
C1 capacitor
F, Fg force of attraction
Id, Isq current
IL, IL1 induced current (first induced current)
IL2 induced current (second induced current)
Vr voltage

The invention claimed is:

1. A cutoff device comprising:
an electrical path;
a first coil in which a first induced current corresponding to an electric current flowing through the electrical path is generated;
a breaker configured to interrupt the electrical path;
a switch configured to electrically connect the first coil and the breaker by allowing the first induced current to flow when the first induced current exceeds a predetermined value, the first coil, the breaker, and the switch being connected in series; and
wiring configured to electrically connect the first coil and the breaker, wherein
the breaker is driven with the first induced current generated in the first coil.

2. The cutoff device according to claim 1, further comprising:
a first resistor connected to the first coil,
wherein the first resistor is connected in parallel with the switch and the breaker.

3. The cutoff device according to claim 2, wherein
the switch is a first semiconductor switch.

4. The cutoff device according to claim 3, wherein
the first semiconductor switch includes a SIDAC (registered trademark) or a thyristor.

5. The cutoff device according to claim 1, further comprising:
a yoke inserted through a through-hole of the first coil.

6. The cutoff device according to claim 1, wherein
the breaker is a pyro-fuse including an igniter, and
the igniter is driven with the first induced current.

7. The cutoff device according to claim 1, wherein the first induced current is provided to the braker.

8. The cutoff device according to claim 1, wherein
the breaker is an electromagnetic relay configured to operate with the first induced current.

9. The cutoff device according to claim 8, wherein
the electromagnetic relay includes a fixed terminal, a movable contactor that moves into or out of contact with the fixed terminal, and a drive coil that causes the movable contactor to operate, and
the movable contactor operates with the first induced current.

10. A driving device that drives a device, the driving device comprising:
a coil in which an induced current corresponding to an electric current flowing through an electrical path is generated;
a switch configured to electrically connect the coil and the device by allowing the induced current to flow when the induced current exceeds a predetermined value; and
wiring configured to electrically connect the coil and the device, wherein:
the coil, the switch and the device are connected in series, and
the induced current generated in the coil is provided to the device to drive the device.

* * * * *